(12) United States Patent
Suzuki et al.

(10) Patent No.: US 8,792,552 B2
(45) Date of Patent: Jul. 29, 2014

(54) CONTENT SUPPLYING APPARATUS AND METHOD, AND RECORDING MEDIUM

(75) Inventors: Teruhiko Suzuki, Chiba (JP); Peter Kuhn, Tokyo (JP)

(73) Assignee: Sony Corporation, Tokyo (JP)

( * ) Notice: Subject to any disclaimer, the term of this patent is extended or adjusted under 35 U.S.C. 154(b) by 124 days.

(21) Appl. No.: 12/837,288

(22) Filed: Jul. 15, 2010

(65) Prior Publication Data

US 2011/0019084 A1 Jan. 27, 2011

Related U.S. Application Data

(60) Continuation of application No. 11/120,714, filed on May 3, 2005, now Pat. No. 7,782,941, which is a division of application No. 09/804,434, filed on Mar. 12, 2001, now Pat. No. 7,020,196.

(30) Foreign Application Priority Data

Mar. 13, 2000 (JP) ................................. 2000-068719
May 19, 2000 (JP) ................................. 2000-147768

(51) Int. Cl.
*H04N 7/12* (2006.01)
*H04N 7/01* (2006.01)

(52) U.S. Cl.
USPC ..................................... 375/240.12; 348/445

(58) Field of Classification Search
USPC ............ 375/240.12, 240.04, 240.29; 345/1.1; 370/468; 709/218; 382/195; 725/87
See application file for complete search history.

(56) References Cited

U.S. PATENT DOCUMENTS

| 5,231,484 | A | * | 7/1993 | Gonzales et al. ........ 375/240.04 |
| 5,517,652 | A | | 5/1996 | Miyamoto et al. |
| 5,594,495 | A | | 1/1997 | Palmer et al. |
| 5,805,220 | A | | 9/1998 | Keesman et al. |
| 5,963,222 | A | | 10/1999 | Cheney et al. |
| 6,018,768 | A | * | 1/2000 | Ullman et al. ................ 709/218 |
| 6,031,872 | A | | 2/2000 | Han |
| 6,181,711 | B1 | * | 1/2001 | Zhang et al. .................. 370/468 |
| 6,345,279 | B1 | | 2/2002 | Li et al. |
| 6,408,350 | B1 | | 6/2002 | Kawamura et al. |

(Continued)

FOREIGN PATENT DOCUMENTS

| EP | 0 889 650 | 1/1999 |
| EP | 0 889 650 A2 | 1/1999 |

(Continued)

OTHER PUBLICATIONS

Kuhn, P.M. et al., "MPEG-7 Metadata for Video Transcoding: Motion and Difficulty Hints," Proceedings of the SPIE, SPIE, Bellingham, VA, US, vol. 4315, Jan. 24, 2001, pp. 352-361, XP001032822 ISSN: 0277-786X.

(Continued)

*Primary Examiner* — Gims Philippe
(74) *Attorney, Agent, or Firm* — Finnegan, Henderson, Farabow, Garrett & Dunner, L.L.P.

(57) ABSTRACT

A content supplying apparatus includes a multimedia content server which keeps a list of coding parameters at predetermined bit rates. The coding parameters for transmitting a bit stream are determined in accordance with a transmission capacity based on the coding parameter list. Based on the obtained coding parameters, the bit stream is converted and is transmitted to a transmission channel.

12 Claims, 20 Drawing Sheets

(56) References Cited

U.S. PATENT DOCUMENTS

| | | | |
|---|---|---|---|
| 6,466,625 B1* | 10/2002 | Kobayashi et al. | 375/240.29 |
| 6,490,370 B1* | 12/2002 | Krasinski et al. | 382/195 |
| 6,501,441 B1* | 12/2002 | Ludtke et al. | 345/1.1 |
| 6,513,069 B1 | 1/2003 | Abato et al. | |
| 6,628,839 B1 | 9/2003 | Komiya et al. | |
| 6,678,322 B1 | 1/2004 | Mihara | |
| 7,020,196 B2 | 3/2006 | Suzuki et al. | |
| 2001/0047517 A1* | 11/2001 | Christopoulos et al. | 725/87 |

FOREIGN PATENT DOCUMENTS

| | | |
|---|---|---|
| EP | 0 843 301 | 6/1999 |
| EP | 0 924 933 | 6/1999 |
| EP | 1 032 212 | 8/2000 |
| EP | 1254429 (A1) | 11/2002 |
| JP | 2003-523024 | 7/2003 |
| WO | WO 99 62268 | 12/1999 |
| WO | WO 01/59706 A1 | 8/2001 |

OTHER PUBLICATIONS

Kuhn, P. et al., "Report on the CE on the Transcoding Hint DS," ISO/IEC JTC/SC29/WG11 MPEG2000/M6002, May 2000, pp. 1-43, XP001001466.

Tudor, P.N. et al., "Real-Time Transcoding of MPEG-2 Video Bit Streams," International Broadcasting Convention, London, GB, No. 447, Sep. 1997, pp. 296-301, COMPL, XP000668774.

Vetro, A. et al., "MPEG-4 Rate Control for Multiple Video Objects," IEEE Transactions on Circuits and Systems for Video Technology, IEEE Inc., New York, US., vol. 9, No. 1, Feb. 1999, pp. 186-199, XP000802297 ISSN: 1051-8215.

Peter Kuhn et al., "Proposal of Contents Adaptive Transoding Hints Metadata," *ITU Study Group 16—Video Coding Experts Group—ISO/IEC MPEG & ITU-T VCEG (ISO/IEC JTC1/SC29/WG11 and ITU-T SG16 Q6)*, XX, XX, No. M5845, Mar. 14, 2000 (200-03-14), XP030035022 (pp. 1-31).

"Proposed SMPTE Standard for Television—MPEG-2 Video Recording Data Set," SMPTE—327M—Motion Imaging Journal, Society of Motion Picture and Television Enginers, White Plains, NY, US, vol. 109, No. 2, Feb. 1, 2000, XP000913023 (pp. 146-150).

"Core Experiment on Media Transcoding Hint DS," ITU Study Group 16 Video Coding Experts Group—ISO/IEC MPEG & ITU-T VCEG (ISO/IEC JTC1/SC29/WG11 and ITU-T SG16 Q6), XX, XX, No. N3130, Dec. 11, 1999, XP030011260 (pp. 1-5).

Tudor P. N. et al., "Real-Time Transcoding of MPEG-2 Video BIT Streams," International Broadcasting Convention, London, GB, No. 447, Sep. 1997, XP000668774 (7 pgs.).

European Search Report dated Jun. 17, 2011 (11 pgs.).

Summons to Attend Oral Proceedings under Rule 115(a) issued in EP 2369842 (EP Application No. 10010847.1) on Apr. 9, 2014.

"Proposed SMPTE Standard for Television-MPEG-2 Video Recording Data Set" *SMPTE'Motion Imaging Journal*, Society of Motion Picture and Television Engineers, White Plains, NY, vol. 109, No. 2, Feb. 1, 2000, pp. 146-150.

"Core Experiment on Media Transcoding Hint DS", *ITU Study Group 16*—Video Coding Experts Group—ISO/IEC MPEG & ITU-T VCEG (ISO/IEC JTC1/SC29/WG11 and ITU-T SG16 Q6, No. N3130, Dec. 11, 1999.

* cited by examiner

FIG. 12A
```
TranscodingHint {
    int ID;
    TranscodingParameterSet( );
    TranscodingComplextyHint( );
}
```

FIG. 12B
```
TranscodingParameterSet {
    int ID;
    int MinBitRate;
    int MaxBitRate;
    int FrameRate;
    int FrameSize;
}
```

FIG. 12C
```
TranscodingComplexityHint {
    int ID;
    int StartMediaLocator;
    int EndMediaLocator;
    int Complexity;
}
```

FIG. 12D
```
TranscodingComplexityHint {
    int ID;
    int StartFrameNumber;
    int EndFrameNumber;
    int Complexity;
}
```

FIG. 19A

```
MediaTranscodingHint {
    Int ID;
    UtilityScaling( );
    MotionHint( );
    TextureHint( );
}
```

FIG. 19B

```
MotionHint {
    int ID;
    int Motion_uncompensability;
    int Motion_range_x_left;
    int Motion_range_x_right;
    int Motion_range_y_left;
    int Motion_range_y_right;
}
```

FIG. 19C

```
TextureHint {
    int ID;
    int Difficulty;
    char DifficultyType;
}
```

| VALUE | MEANING |
|---|---|
| 0 | Encoding Difficulty |
| THE OTHERS | Reserved |

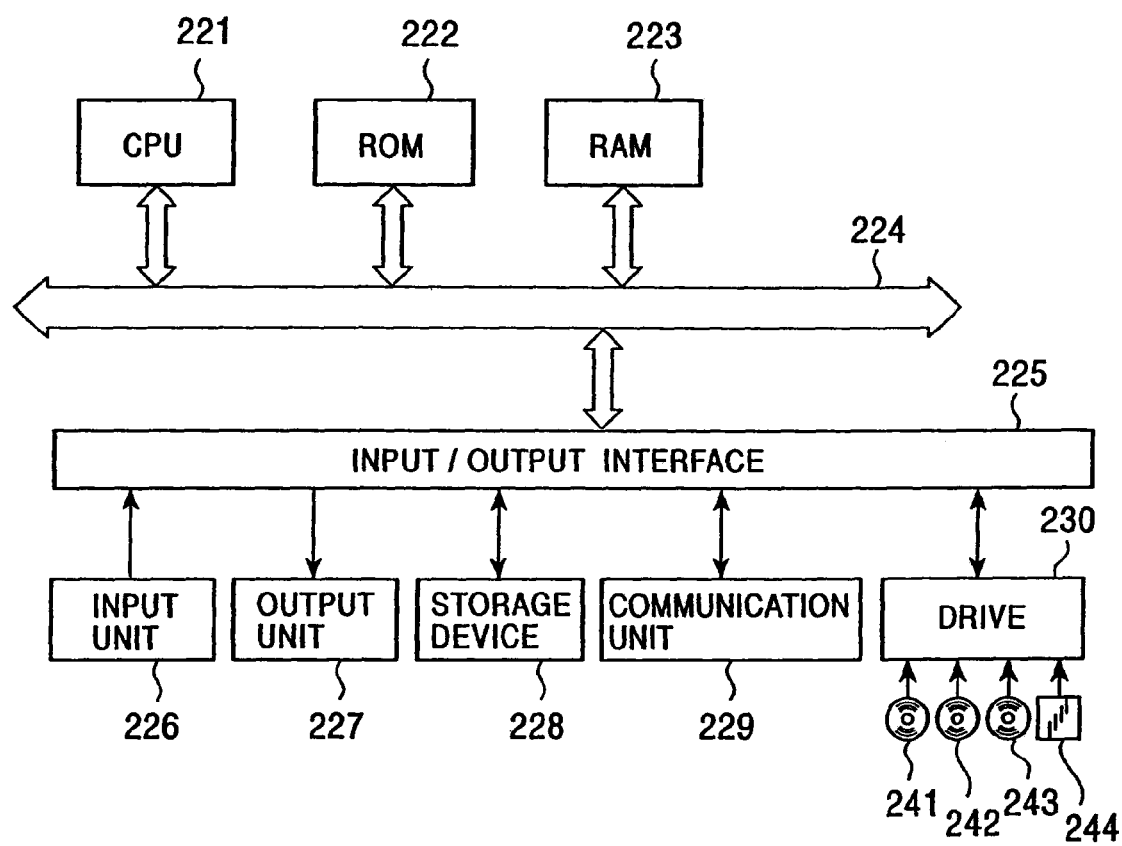

CONTENT SUPPLYING APPARATUS AND METHOD, AND RECORDING MEDIUM

This is a continuation of U.S. application Ser. No. 11/120,714, filed May 3, 2005, now U.S. Pat. No. 7,782,941 which is a divisional of U.S. application Ser. No. 09/804,434 (now U.S. Pat. No. 7,020,196), filed Mar. 12, 2001, and claims priority of Japanese Application Nos. 2000-068719, filed Mar. 13, 2000, and 2000-147768, filed May 19, 2000, all of which are incorporated herein by reference.

BACKGROUND OF THE INVENTION

1. Field of the Invention

The present invention relates to content supplying apparatuses and methods and to recording media. More specifically, the present invention relates to a content supplying apparatus and method and to a recording medium, which are suitable for recording moving-picture signals on a recording medium, such as a magneto-optical disk or a magnetic tape, reading the signals, and displaying the signals on a display; suitable for transmitting moving-picture signals from a transmitting side to a receiving side through a transmission channel, in which the receiving side receives and displays the signals in the same way as in a teleconferencing system, a videophone system, a broadcasting system, a multimedia database search system, and the like; and suitable for editing and recording moving-picture signals.

2. Description of the Related Art

In a system such as a teleconferencing system or a videophone system for transmitting moving-picture signals to a remote place, image signals are compressed and encoded using line correlation between video signals and inter-frame correlation in order to efficiently make use of a transmission channel.

The Moving Picture Expert Group (MPEG) system, which is a storage moving picture coding system, is a typical high-efficiency coding system for moving pictures. This system has been discussed under the ISO-IEC/JTC1/SC2/WG11 standard and has been proposed as a draft of the standard. This system employs a hybrid system combining motion-compensated predictive coding and discrete cosine transform (DCT) coding.

In MPEG, a few profiles and levels are defined in order to serve various applications and functions. The most elementary profile/level is the main profile at main level (MP@ML).

Referring to FIG. 1, an example of the structure of an encoder conforming to the main profile at main level (MP@ML) using the MPEG system is described.

An input image signal is input to a frame memory group 1 and is encoded in a predetermined order.

Image data to be encoded is input to a motion vector detecting circuit 2 in macroblock units. The motion vector detecting circuit 2 processes image data in each frame in accordance with a predetermined sequence which is set in advance, as either an I picture, a P picture, or a B picture. The order of processing of sequentially-input images in each frame as I, P, or B picture is determined in advance (for example, the images are processed in the order I, B, P, B, P, . . . B, P).

The motion vector detecting circuit 2 refers to a predetermined reference frame which is determined in advance and performs motion compensation to detect a motion vector. The motion compensation (inter-frame prediction) includes three modes, namely, forward prediction, backward prediction, and bidirectional prediction. P pictures only employ a forward prediction mode. For B pictures, there are three prediction modes, i.e., forward prediction, backward prediction, and bidirectional prediction. The motion vector detecting circuit 2 selects a prediction mode that minimizes prediction error and generates the prediction mode.

At the same time, the prediction error is compared with, for example, a variance of a macroblock to be encoded. When the macroblock variance is smaller than the prediction error, no prediction is performed using that macroblock. Instead, intra-frame coding is performed. In this case, the intra-image coding prediction mode (intra) is used. The motion vector and the prediction mode are input to a variable-length coding circuit 6 and a motion compensation circuit 12.

The motion compensation circuit 12 generates a prediction image based on a predetermined motion vector and inputs the prediction image to an arithmetic circuit 3. The arithmetic circuit 3 outputs a differential signal between the value of the macroblock to be encoded and the value of the prediction image to a DCT circuit 4. In the case of an intra macroblock, the arithmetic circuit 3 directly outputs the signal of the macroblock to be encoded to the DCT circuit 4.

The DCT circuit 4 performs a discrete cosine transform (DCT) of the input data and converts it into DCT coefficients. The DCT coefficients are input to a quantization circuit 5 and are quantized using a quantization step corresponding to a data storage amount (buffer storage amount) of a transmission buffer 7. The quantized data is input to the variable-length coding circuit 6.

The variable-length coding circuit 6 converts image data (in this example, I-picture data) supplied from the quantization circuit 5 into a variable-length code, such as a Huffman code or the like, in accordance with the quantization step (scale) supplied from the quantization circuit 5, and the variable-length coding circuit 6 outputs the variable-length code to the transmission buffer 7.

The quantization step (scale) is input to the variable-length coding circuit 6 from the quantization circuit 5. Also a prediction mode (mode indicating which one of intra-image prediction, forward prediction, backward prediction, and bidirectional prediction has been set) and the motion vector are input from the motion vector detecting circuit 2 to the variable-length coding circuit 6. These data are also variable-length coded.

The transmission buffer 7 temporarily stores the input data and outputs data corresponding to the stored amount to the quantization circuit 5.

When a residual amount of data increases to an upper allowable limit, the transmission buffer 7 enlarges the quantization scale of the quantization circuit 5 using a quantization control signal, thus reducing the amount of quantization data. In contrast, when the residual amount of data decreases to a lower allowable limit, the transmission buffer 7 reduces the quantization scale of the quantization circuit 5 using the quantization control signal thereby increasing the amount of the quantization data. In this way, overflow or underflow of the transmission buffer 7 is prevented.

The data stored in the transmission buffer 7 is read at a predetermined time and is output to a transmission channel.

The data output from the quantization circuit 5 is input to a dequantization circuit 8 and is dequantized in accordance with the quantization step supplied from the quantization circuit 5. The output from the dequantization circuit 8 is input to an inverse discrete transform circuit (IDCT) circuit 9 and is inverse-DCT processed, and is in turn stored in a frame memory group 11 via an arithmetic unit 10.

Referring to FIG. 2, an example of the structure of a decoder at MP@ML in MPEG is described. Coded image data transmitted through a transmission channel is received by a receiving circuit (not shown) or is read by a reading unit.

The data is temporarily stored in a reception buffer 31, and then is supplied to a variable-length decoding circuit 32. The variable-length decoding circuit 32 performs variable-length decoding of the data supplied from the reception buffer 31 and outputs the motion vector and the prediction mode to a motion compensation circuit 37 and outputs the quantization step to a dequantization circuit 33. In addition, the variable-length decoding circuit 32 outputs the decoded image data to the dequantization circuit 33.

The dequantization circuit 33 dequantizes the image data supplied from the variable-length decoding circuit 32 in accordance with the quantization step supplied from the variable-length decoding circuit 32 and outputs the data to an IDCT circuit 34. The data (DCT coefficients) output from the dequantization circuit 33 are inverse-DCT processed by the IDCT circuit 34 and are supplied to an arithmetic unit 35.

When the image data supplied from the IDCT circuit 34 is I-picture data, the data is output from the arithmetic unit 35. In order to generate prediction-image data for image data (P or B-picture data) input thereafter to the arithmetic unit 35, the image data is supplied to a frame memory group 36 and is stored in the frame memory group 36. The data is directly output as a read image.

When an input bit stream is a P or B picture, the motion compensation circuit 37 generates a prediction image in accordance with the motion vector and the prediction mode, which are supplied from the variable-length decoding circuit 32, and outputs the prediction image to the arithmetic unit 35. The arithmetic unit 35 adds the image data input from the IDCT circuit 34 and the prediction-image data supplied from the motion compensation circuit 37 and outputs the resulting image. When the input bit stream is a P picture, the output from the arithmetic unit 35 is input to the frame memory group 36 and is stored in the frame memory group 36, so that the data can be used as a reference image for subsequent image signals to be decoded.

In MPEG, various profiles and levels, other than MP@ML, are defined. Also, various tools are prepared. Scalability is one of the tools in MPEG.

In MPEG, a scalable coding system for implementing scalability corresponding to different image sizes and frame rates is introduced. For example, in the case of space scalability, when only decoding a bit stream at a lower layer, an image signal of a small image size is decoded. When decoding a bit stream at a lower layer and an upper layer, an image signal of a large image size is decoded.

Referring to FIG. 3, an encoder for space scalability is described. In the case of space scalability, a lower layer corresponds to an image signal of a small image size, and an upper layer corresponds to an image signal of a large image size.

An image signal at a lower layer is input to the frame memory group 1 and is encoded as in MP@ML. The output from the arithmetic unit 10 is supplied to the frame memory group 11. The output is used not only as a prediction reference image for a lower layer, but also used as a prediction reference image for an upper layer after the image is enlarged by an image enlarging circuit 41 to the size as the image size at the upper layer.

An image signal at an upper layer is input to a frame memory group 51. A motion vector detecting circuit 52 determines a motion vector and a prediction mode, as in MP@ML.

A motion compensation circuit 62 generates a prediction image in accordance with the motion vector and the prediction mode determined by the motion vector detecting circuit 52 and outputs the prediction image to a weighting circuit 44.

The weighting circuit 44 multiplies the prediction image by a weight (coefficient) W and outputs the product to an arithmetic unit 43.

As described above, the output from the arithmetic unit 10 is input to the frame memory group 11 and the image enlarging circuit 41. The image enlarging circuit 41 enlarges the image signal generated by the arithmetic circuit 10 to the size of the image size at the upper layer and outputs the image signal to a weighting circuit 42. The weighting circuit 42 multiplies the output from the image enlarging circuit 41 by a weight (1-W) and outputs the product to the arithmetic unit 43.

The arithmetic unit 43 adds the outputs from the weighting circuits 42 and 44 and outputs the sum as a prediction image to an arithmetic unit 53. The output from the arithmetic unit 43 is also input to an arithmetic unit 60 and is added to the output from an IDCT circuit 59. Subsequently, the sum is input to a frame memory group 61 and is used as a prediction reference frame for subsequent image signals to be encoded.

The arithmetic unit 53 computes the difference between the image signal to be encoded and the output from the arithmetic unit 43 and outputs the difference. In the case of an intra-frame coded macroblock, the arithmetic unit 53 directly outputs the image signal to be encoded to a DCT circuit 54.

The DCT circuit 54 performs a discrete cosine transform of the output from the arithmetic unit 53, generates DCT coefficients, and outputs the DCT coefficients to a quantization circuit 55. As in MP@ML, the quantization circuit 55 quantizes the DCT coefficients in accordance with a quantization scale determined based on the data storage amount of a transmission buffer 57 or the like and outputs the quantized DCT coefficients to a variable-length coding circuit 56. The variable-length coding circuit 56 performs variable-length coding of the quantized DCT coefficients and outputs the result as a bit stream at an upper layer via the transmission buffer 57.

The output from the quantization circuit 55 is dequantized by a dequantization circuit 58 in accordance with the quantization scale used by the quantization circuit 55. The IDCT circuit 59 performs the inverse discrete cosine transform of the dequantized result, and it is in turn input to the arithmetic unit 60. The arithmetic unit 60 adds the outputs from the arithmetic unit 43 and the IDCT circuit 59 and inputs the sum to the frame memory group 61.

The motion vector and the prediction mode detected by the motion vector detecting circuit 52, the quantization scale used by the quantization circuit 55, and the weight W used by the weighting circuits 42 and 44 are input to the variable-length coding circuit 56, and are all encoded and transmitted.

In conventional moving-picture encoders and decoders, it is assumed that the units are in one-to-one correspondence. For example, in a teleconferencing system, a transmitting side and a receiving side are always in one-to-one correspondence. Processing capacities and specifications of a transmitting terminal and a receiving terminal are determined in advance. In storage media such as DVDs and the like, the specification and processing capacities of a decoder are strictly determined in advance, and an encoder encodes motion-picture signals on the assumption that only the decoder satisfying the specifications will be used. When the encoder encodes image signals so that the decoder according to the predetermined specification can achieve optimal image quality, it is always possible to transmit images having optical image quality.

However, when transmitting moving pictures to a transmission channel, such as the Internet, which has a variable transmission capacity which varies in accordance with time or path, or, when transmitting moving pictures to an unspecified number of receiving terminals of which specifications are not determined in advance and which have various processing capacities, it is difficult to know what the optimal image quality is. Hence, it is difficult to efficiently transmit moving pictures.

Since the specifications of terminals are not unique, coding systems for encoders and decoders may differ from one terminal to another. In such cases, it is necessary to efficiently convert a coded bit stream into a predetermined format. However, an optimal converting method has not yet been established.

SUMMARY OF THE INVENTION

In view of the foregoing circumstances, it is an object of the present invention to efficiently transmit image signals through transmission channels having various transmission capacities and to transmit optimal moving pictures to receiving terminals having various processing capacities.

According to an aspect of the present invention, a content supplying apparatus for supplying content to another apparatus based on a request from the other apparatus is provided, including a first obtaining unit for obtaining first information concerning a function of the other apparatus. A second obtaining unit obtains second information concerning the content, the second information corresponding to the first information obtained by the first obtaining unit. A third obtaining unit obtains the content. A converter converts the content obtained by the third obtaining unit based on the second information obtained by the second obtaining unit. A supplying unit supplies the content converted by the converter to the other apparatus.

The second information may include one of a converting parameter for converting the content and a coding difficulty of the content.

The second obtaining unit may obtain the second information from a descriptor which is transmitted separately from the content.

The converter may include a decoding unit for decoding coded content and an encoding unit for encoding the content decoded by the decoding unit based on a decoding parameter which is used by the decoding unit when performing the decoding and the second information described in the descriptor.

According to another aspect of the present invention, a content supplying method for a content supplying apparatus for supplying content to another apparatus based on a request from the other apparatus is provided, including a first obtaining step of obtaining first information concerning a function of the other apparatus. In a second obtaining step, second information concerning the content is obtained, the second information corresponding to the first information obtained in the first obtaining step. In a third obtaining step, the content is obtained. In a converting step, the content obtained in the third obtaining step is converted based on the second information obtained in the second obtaining step. In a supplying step, the content converted in the converting step is supplied to the other apparatus.

According to another aspect of the present invention, a recording medium having recorded thereon a program for a content supplying apparatus for supplying content to another apparatus based on a request from the other apparatus is provided. The program includes a first obtaining step of obtaining first information concerning a function of the other apparatus. In a second obtaining step, second information concerning the content is obtained, the second information corresponding to the first information obtained in the first obtaining step. In a third obtaining step, the content is obtained. In a converting step, the content obtained in the third obtaining step is converted based on the second information obtained in the second obtaining step. In a supplying step, the content converted in the converting step is supplied to the other apparatus.

According to another aspect of the present invention, a signal generating apparatus for generating, based on content, a content-information signal concerning the content is provided. The signal generating apparatus includes a coding difficulty analyzing circuit for analyzing a coding difficulty of the content and outputting the result as the content-information signal. A memory stores the content and the content-information signal.

The coding difficulty analyzing circuit may include a first analyzing circuit for analyzing a motion compensation difficulty of the content.

The coding difficulty analyzing circuit may include a second analyzing circuit for analyzing a compression difficulty of the content in the space domain.

According to another aspect of the present invention, a converting apparatus for converting content into content in a predetermined format is provided, including a memory for storing the content and a content-information signal concerning the content. A first obtaining unit obtains information on a terminal for reading the content. A converter converts the content into a format suitable for the terminal based on the content-information signal. The content-information signal includes coding difficulty information indicating a coding difficulty of the content. The converter converts the content based on the coding difficulty information.

According to another aspect of the present invention, a reading terminal for converting content into content in a predetermined format and reading the content is provided, including a memory for storing the content and a content-information signal concerning the content. A converter converts the content into a format suitable for the reading terminal based on the content-information signal. A reading unit reads the converted content. The content-information signal includes coding difficulty information indicating a coding difficulty of the content. The converter converts the content based on the coding difficulty information.

According to the present invention, obtained content is converted based on second information and is supplied to another apparatus. It is therefore possible to perform efficient transmission of content to transmission channels having various transmission capacities and to units having various processing capacities. In addition, it is possible to transmit content and information concerning the content in response to a request from another unit, thus achieving a system capable of supplying content in accordance with capacities of the other unit.

BRIEF DESCRIPTION OF THE DRAWINGS

FIGS. 12A to 12D illustrate the structure of a content-information signal;

FIGS. 19A to 19C illustrate the structure of a MediaTranscodingHint Ds;

FIG. 24 is a block diagram of an example of the structure of a personal computer.

DESCRIPTION OF THE PREFERRED EMBODIMENTS

First Embodiment

Figure 1:
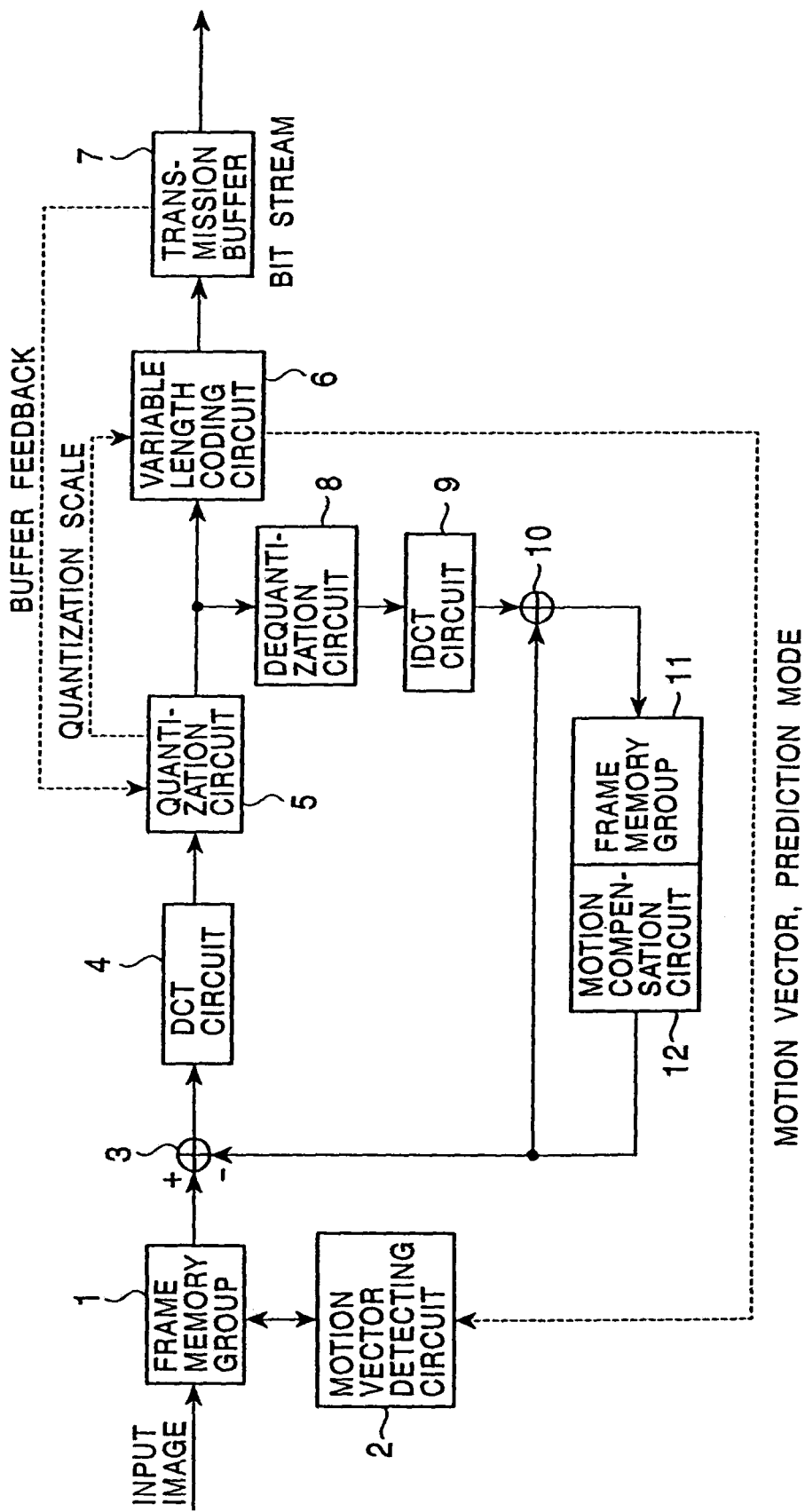
FIG. 1 is a block diagram of the structure of a conventional MPEG encoder.
Figure 2:
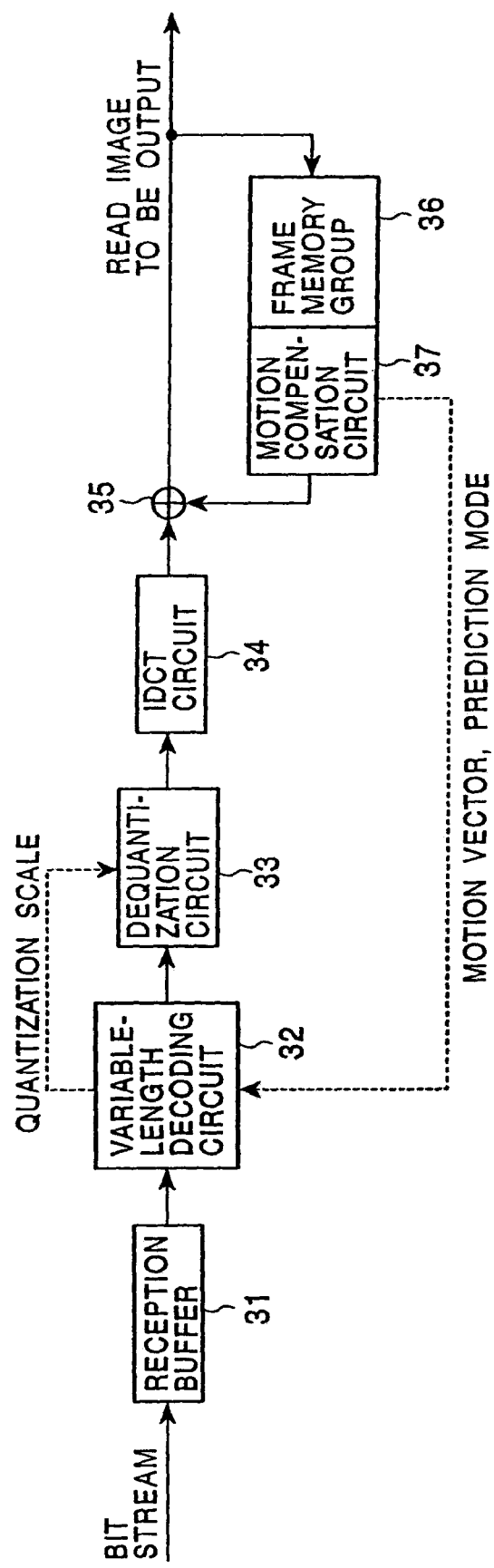
FIG. 2 is a block diagram of the structure of a conventional MPEG decoder.
Figure 3:
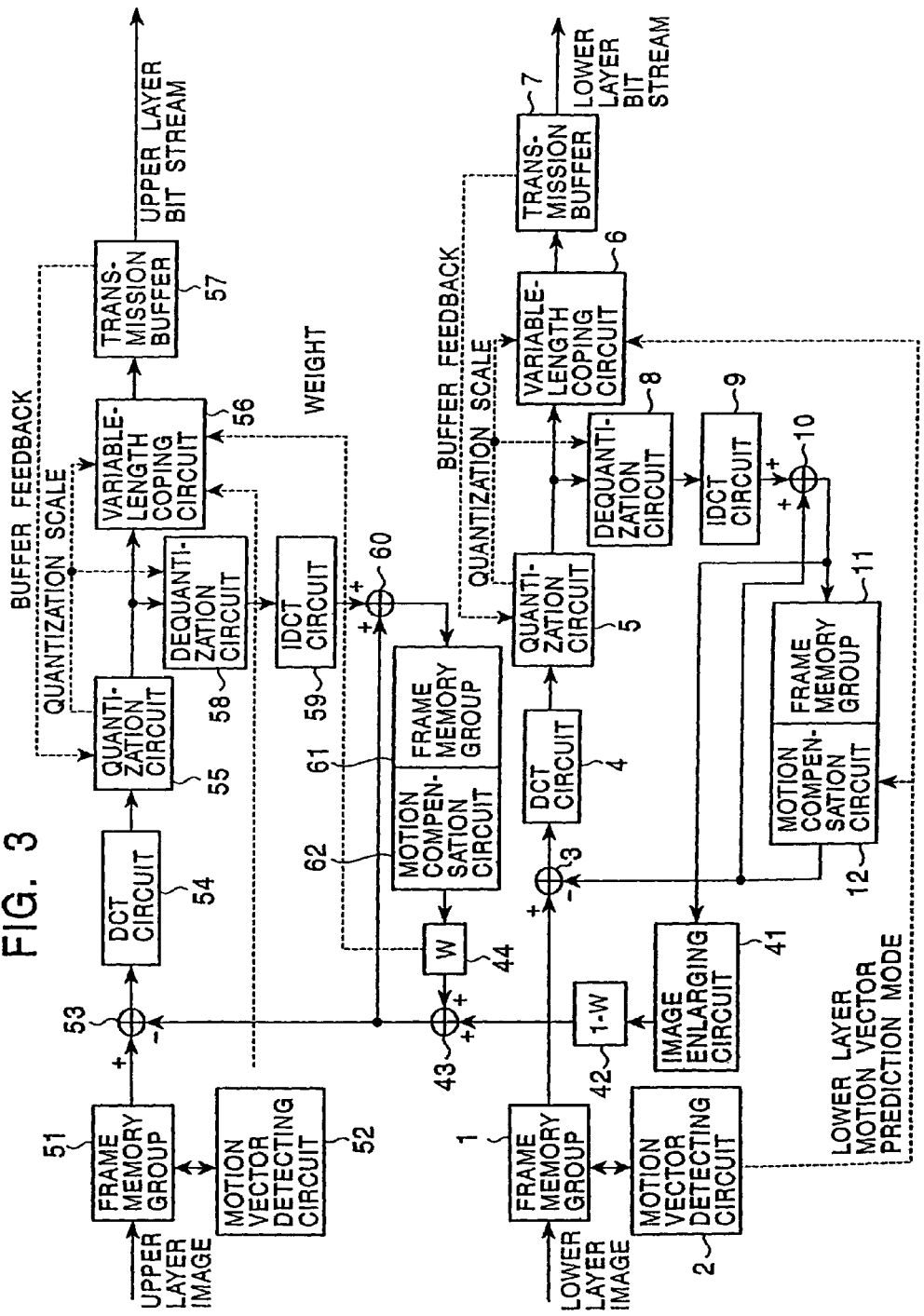
FIG. 3 is a block diagram of the structure of another conventional MPEG encoder.
Figure 4:
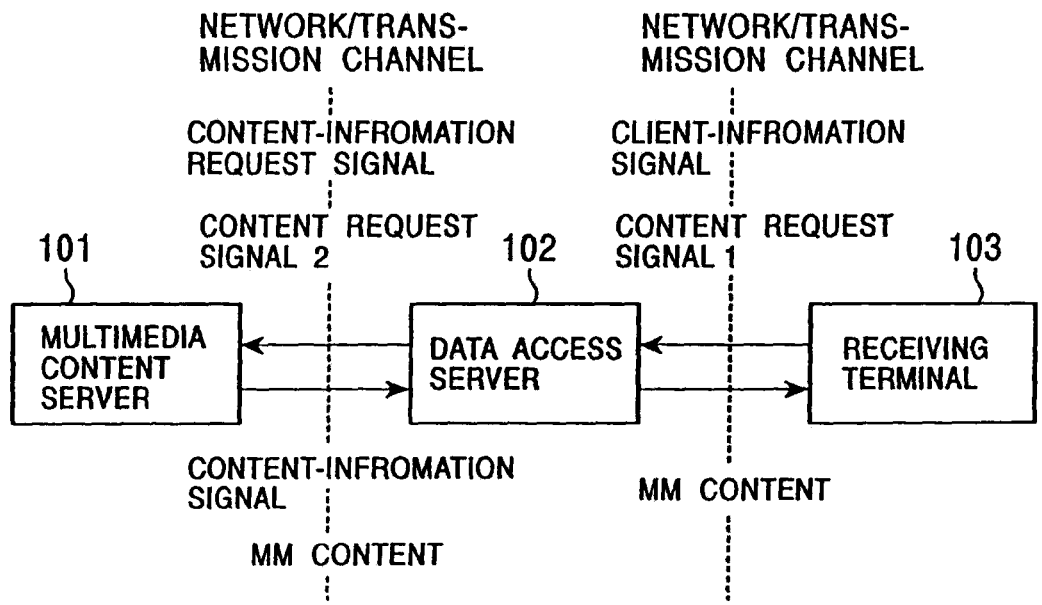
FIG. 4 is a block diagram of the structure of a system according to an embodiment of the present invention.

FIG. 4 shows the structure of a system according to a first embodiment of the present invention.

A multimedia content server 101 records and stores multimedia content, such as moving pictures or the like, in a storage medium (e.g., a content storage device 112 shown in FIG. 5, which will be described below) such as a hard disk or the like. The multimedia content is uncompressed or is recorded in a compression bit stream format such as MPEG-1, MPEG-2, or MPEG-4 (hereinafter abbreviated as MPEG-1/2/4 or the like).

A receiving terminal (client) 103 requests, receives, and displays the multimedia content. A user uses the receiving terminal 103 to obtain the content. The receiving terminal 103 transmits a content request signal 1 for requesting predetermined content and a client information signal indicating its own processing capacities, such as memory size, resolution of an image display device, computation capacity, buffer size, decodable bit-stream format, and the like.

The content request signal 1 is information including semantic contents of the requested content, such as the title of a movie. The content request signal 1 is encoded by MPEG-7 encoding system.

A data access server 102 receives the content request signal 1 and the client information signal from the receiving terminal 103 via a network or a predetermined transmission channel. The data access server 102 transmits a content-information request signal for requesting information on the content requested based on the content request signal 1 to the multimedia content server 101 via a network or a predetermined transmission channel.

The multimedia content server 101 records multimedia content and information on the recorded multimedia content in built-in storage media. When the multimedia content server 101 receives the content-information request signal, the multimedia content server 101 transmits a predetermined content-information signal to the data access server 102 based on the received content-information request signal.

The content-information signal includes information on the multimedia content recorded in the multimedia content server 101. The content-information signal includes information such as file name, content title, author, cast, and the like. The content-information signal includes both semantic information and physical information and is encoded by MPEG-7. The physical information includes, for example, a file name recorded in a storage medium and a pointer indicating a predetermined position in a bit stream. The semantic information includes, for example, the title of content and cast.

The data access server 102 defines predetermined content based on the content-information signal, the content request signal 1, and the client information signal, and transmits a content request signal 2 for requesting the content to the multimedia content server 101.

The content request signal 2 includes, for example, a file name. The content request signal 2 includes physical information, such as a file name or a pointer indicating a predetermined position in a bit stream. The content request signal 2 is encoded by, for example, MPEG-7.

The multimedia content server 101 transmits the multimedia (MM) content requested by the content request signal 2 to the data access server 102.

The data access server 102 receives the content-information signal and the multimedia content from the multimedia content server 101. The data access server 102 converts the multimedia content into an optimal format (by a process referred to as "transcoding") based on the client information signal and the content-information signal. The data access server 102 transmits the converted multimedia content to the receiving terminal 103.

With continued reference to FIG. 4, the data access server 102 and the receiving terminal 103 are separated by a transmission channel, and the data access server 102 and the multimedia content server 101 are separated by a transmission channel. The multimedia content server 101, the data access server 102, and the receiving terminal 103 are indicated as independent units. Alternatively, these units can be mounted in a single terminal. For example, the multimedia content server 101, the data access server 102, and the receiving terminal 103 can be provided in a single terminal. The multimedia content server 101 and the data access server 102 can be provided in a single terminal, and the receiving terminal 103 can be provided as a separate terminal isolated by a network. Similarly, the multimedia content server 101 can be provided as a separate terminal isolated by a network, and the data access server 102 and the receiving terminal 103 can be provided in a single terminal. In the following description, the units are described as independent units in order to simplify the description. However, the following description applies to a case in which all the units are provided in a single terminal.

Figure 5:
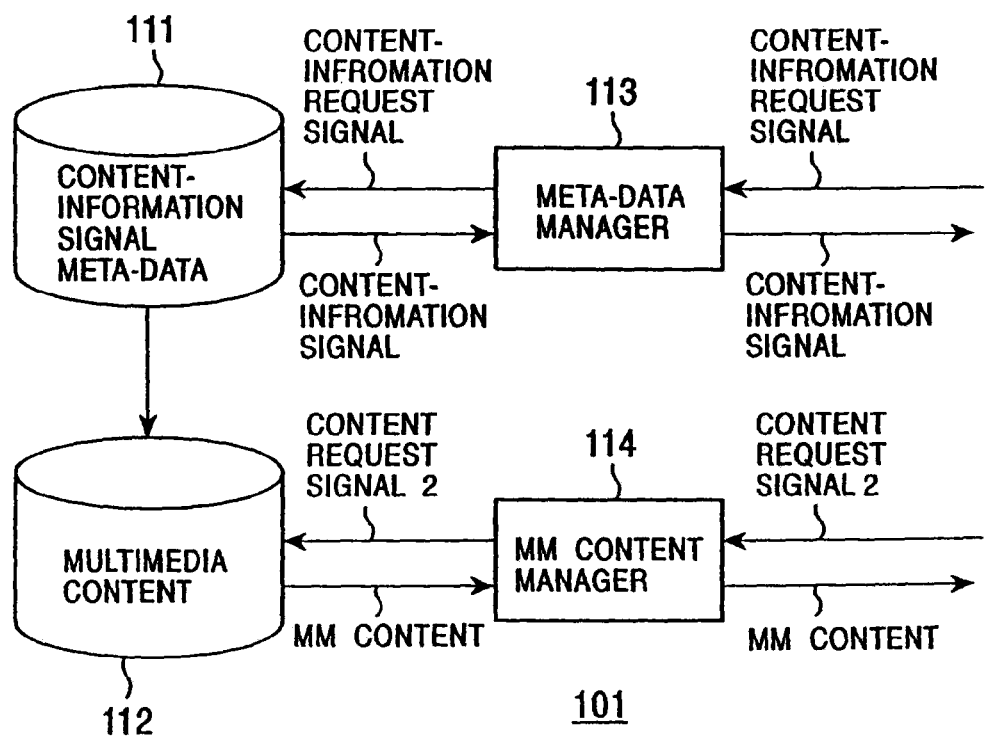
FIG. 5 is a block diagram of the structure of a multimedia content server shown in FIG. 4.

Referring to FIG. 5, an example of the structure of the multimedia content server 101 shown in FIG. 4 is illustrated. A meta-data storage device 111 records the content-information signal and other meta-data describing the content information. The content storage device 112 records the multimedia content including moving pictures.

The content-information signal and other meta-data related to the content include semantic and physical information. The semantic information includes, for example, the title of a movie and the name of the director. The physical information includes, for example, file name, URL, and a pointer indicating a predetermined position in a bit stream. The content-information signal and the meta-data are encoded by, for example, MPEG-7 and are recorded.

The multimedia content itself is encoded by various formats, such as MPEG-1/2/4, and is recorded in the content storage device 112.

The content-information request signal input by the data access server 102 is input to a meta-data manager 113. The meta-data manager 113 manages the meta-data and the content-information signal recorded in the meta-data storage device 111. The meta-data manager 113 supplies the content-information request signal to the meta-data storage device 111.

The meta-data storage device 111 searches for predetermined meta-data or content-information signal based on the supplied content-information request signal and supplies the search result to the meta-data manager 113. The meta-data manager 113 outputs the content-information signal to the data access server 102 shown in FIG. 4.

The content request signal 2 input from the data access server 102 is input to a multimedia content manager 114. The multimedia content manager 114 manages the multimedia content recorded in the content storage device 112. The multimedia content manager 114 supplies the content request signal 2 to the content storage device 112.

The content storage device 112 searches for predetermined multimedia (MM) content based on the supplied content request signal 2 and outputs the search result to the multimedia content manager 114. The multimedia content manager 114 outputs the multimedia content to the data access server 102 shown in FIG. 4.

Figure 6:
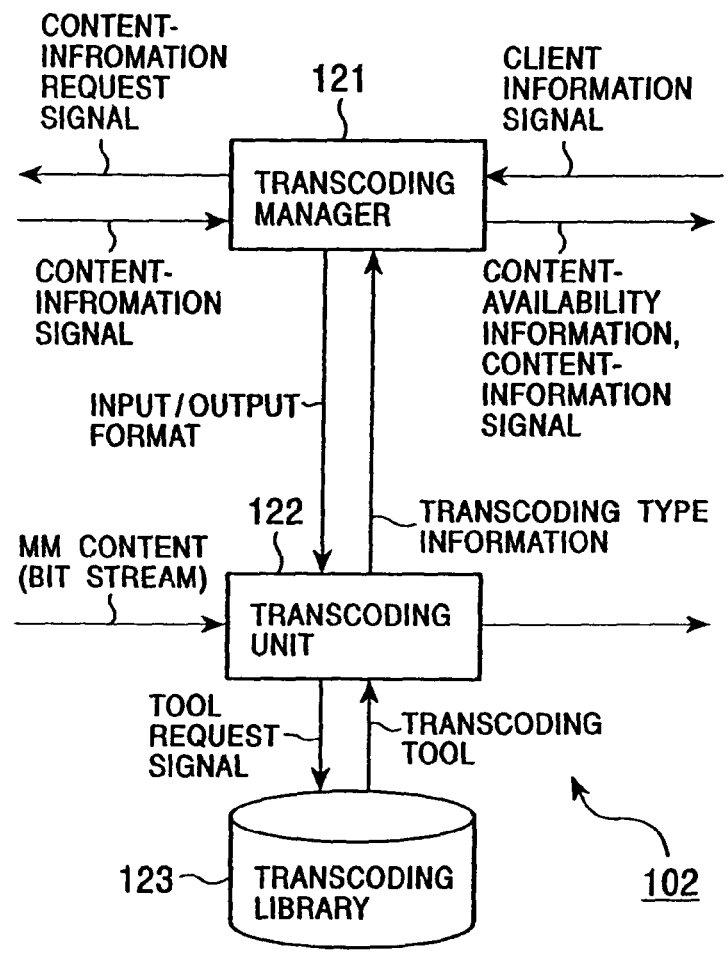
FIG. 6 is a block diagram of the structure of a data access server shown in FIG. 4.

FIG. 6 shows an example of the structure of the data access server 102 shown in FIG. 4. The data access server 102 includes a transcoding manager 121, a transcoding unit 122, and a transcoding library 123.

The client information signal input from the receiving terminal 103 shown in FIG. 4 is input to the transcoding manager 121. The content-information signal input from the multimedia content server 101 shown in FIG. 4 is input to the transcoding manager 121.

The transcoding manager 121 determines the output format of the multimedia content based on the client information signal and the content-information signal. The transcoding manager 121 outputs transcoding type information to the transcoding unit 122. The transcoding type information indicates the output format of the multimedia content and a transcoding method for the transcoding unit 122.

The transcoding manager 121 outputs content availability information and the content-information signal to the receiving terminal 103 shown in FIG. 4. When the requested content is not detected in the multimedia content server 101, the transcoding manager 121 sets the content availability information to "0". When the requested content is detected in the multimedia content server 101, the transcoding manager 121 sets the content availability information to "1".

The transcoding unit 122 converts the input content based on the transcoding type information.

The transcoding unit 122 can be implemented as a software module operating on a central processing unit (CPU) or digital signal processor (DSP). In such a case, the transcoding unit 122 uses a predetermined transcoding tool recorded in the transcoding library 123 based on the transcoding type information and performs transcoding (conversion of the content). Based on the transcoding type information, the transcoding unit 122 outputs a tool request signal to the transcoding library 123. The transcoding library 123 outputs the requested software module (transcoding tool) to the transcoding unit 122. The transcoding unit 122 reserves necessary memory or the like for executing the software module and performs transcoding using the software module.

Figure 7:
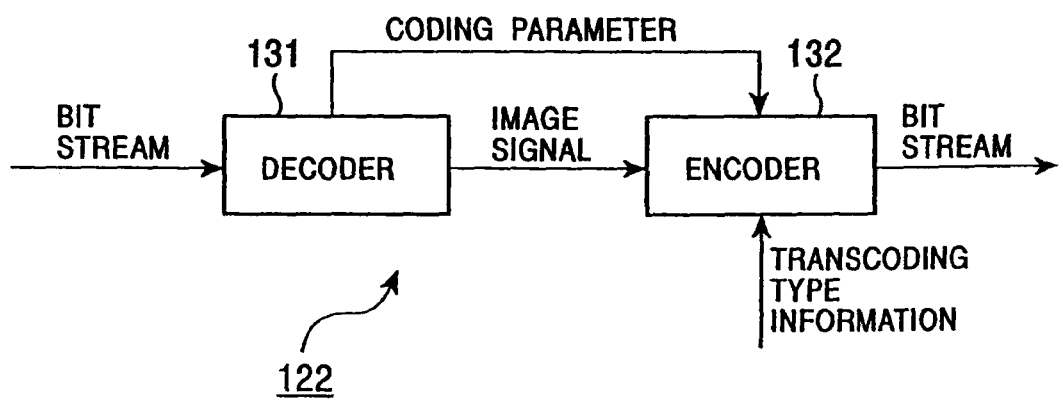
FIG. 7 is a block diagram of the structure of a transcoding unit shown in FIG. 6.

Referring to FIG. 7, an example of the structure of the transcoding unit 122 is described. The simplest method to implement the transcoding unit 122 is decoding the content (bit stream) and thereafter re-encoding the content using an encoder in a predetermined format.

In the transcoding unit 122 shown in FIG. 7, a bit stream supplied by the multimedia content server 101 is input to a decoder 131 and is decoded. A decoded image signal is supplied to an encoder 132 in a format in which the receiving terminal 103 can receive data, and the signal is encoded.

Coding parameters, such as a motion vector, quantization coefficients, and a coding mode, which are decoded when the bit stream is decoded by the decoder 131, are supplied to the encoder 132, and the coding parameters are used when the encoder 132 encodes an image signal. The encoder 132 encodes the decoded image based on the coding parameters supplied from the decoder 131 and the transcoding type information supplied from the transcoding manager 121, generates a bit stream in a predetermined format, and outputs the bit stream.

Figure 8A:
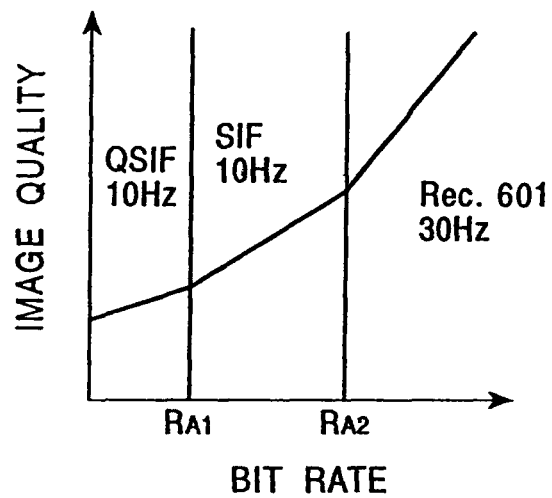
FIGS. 8A and 8B are graphs describing the transcoding.
Figure 8B:
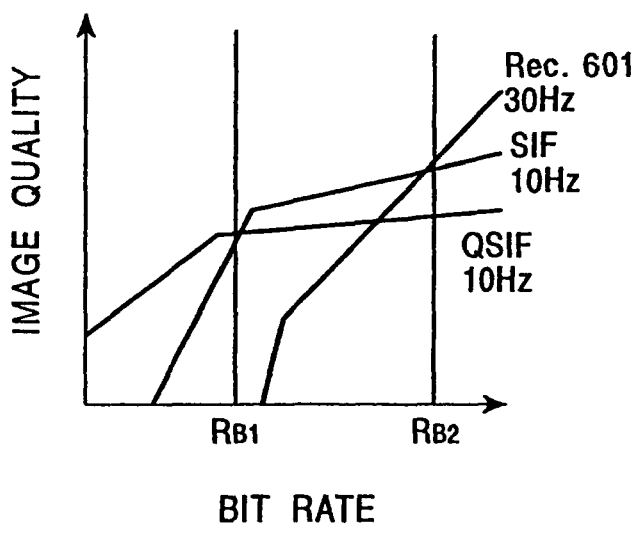

Referring to FIGS. 8A and 8B, an example of a transcoding method performed by the transcoding unit 122 using the content-information signal is described.

When encoding predetermined content, even if done at the same bit rate, the image quality will differ according to frame size, frame rate, or the like. An example of this is illustrated in FIG. 8B. The graph illustrates the relationship between bit rate (abscissa in FIG. 8B) and image quality (ordinate in FIG. 8B) when the same image is encoded using three different frame sizes and frame rates. When a bit rate is sufficiently high, the image quality is best when an image is in a large frame (ITU-R Recommendation 601) at a high frame rate (30 Hz). At a lower bit rate, the image quality begins to deteriorate suddenly.

At a predetermined bit rate $R_{B2}$ or lower, the image quality of the image being encoded is improved when the image size Rec.601 is reduced to half lengthwise and crosswise (SIF) and when the frame rate is reduced (to 10 Hz). At a predetermined bit rate $R_{B1}$ or lower, the image quality of the image being encoded is improved when the image size SIF is further reduced to half lengthwise and crosswise (QSIF). An image size and a frame rate for obtaining optimal image quality at each bit rate depend on image properties. The relationship shown in FIG. 8B is different for each content.

The content-information signal in the present embodiment is, for example, a list of optimal coding parameters for encoding the content at each bit rate. An example of this is shown in FIG. 8A. For the content-information signal at a bit rate $R_{41}$ or lower, encoding is performed using a ¼-size frame and a frame rate 10 Hz. At a bit rate ranging from $R_{41}$ to $R_{42}$, encoding is performed using a ½-size frame. At a bit rate $R_{42}$ or higher, Rec 601-size and a frame rate 30 Hz are used to perform encoding.

A method for describing the content-information signal in this case is described in detail hereinafter.

Referring to FIGS. 9A to 9D, modifications of the transcoding method performed by the transcoding unit 122 using the content-information signal are described. Transmission channels for transmitting predetermined multimedia content include two types, i.e., a transmission channel having a variable bit rate allowing a bit rate to vary over time and a transmission channel having a fixed bit rate. Coding systems include two types, i.e., a coding system capable of encoding at a variable bit rate and a coding system for encoding at a fixed bit rate.

For example, in teleconferencing systems and when broadcasting via wireless transmission links, a bit stream is encoded at a fixed bit rate. In contrast, in a DVD or the like, a bit stream is encoded at a variable bit rate. In coding systems such as MPEG-1 and H.263, only encoding at a fixed bit rate is possible. In MPEG-2 and MPEG-4, encoding at a variable bit rate is possible.

Figure 9A:
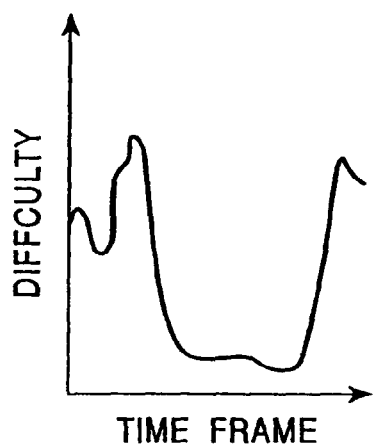
FIGS. 9A to 9D are graphs describing the transcoding.

When encoding content, the image quality is generally better when the content is encoded at a variable bit rate as opposed to a fixed bit rate. The coding efficiency of content depends on the properties of the image. If the content is different, the coding efficiencies will also be different. A single piece of content has different coding efficiencies over time. FIG. 9A shows an example of time-varying coding difficulty. Time is plotted in abscissa, and coding difficulty is plotted in ordinate. In a scene with low coding difficulty, good image quality can be achieved at a low bit rate. In contrast, in a scene with high coding difficulty, it is difficult to achieve sufficient image quality even at a high bit rate.

Figure 9B:
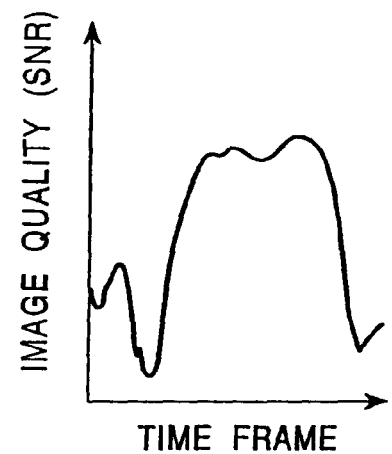

FIG. 9B shows time-varying image quality when a moving picture is encoded at a fixed bit rate. Comparing FIG. 9A and FIG. 9B, it is clear that, when coding at a fixed bit rate, image quality improves in scenes with low coding difficulty, whereas image quality deteriorates in scenes with high coding difficulty. Thus, image quality greatly varies over time.

Figure 9C:
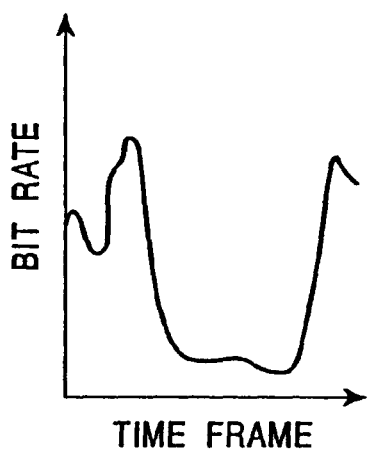
Figure 9D:
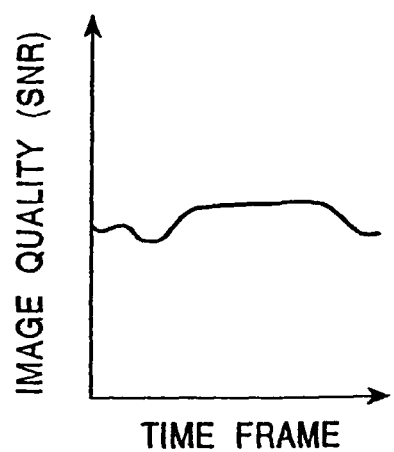

FIG. 9C shows a time-varying coding bit rate when a moving picture used in the case shown in FIG. 9A is encoded at a variable bit rate. In a scene with high coding difficulty, a higher bit rate is allocated. In a scene with low coding difficulty, a relatively small number of bits is allocated. As a result, image quality is changed as shown in FIG. 9D. By comparison, when coding at a fixed bit rate (FIG. 9B), the average image quality is better for a variable bit rate even though the number of bits generated in the content is the same. In variable bit-rate coding, there is less variation in image quality with time.

In order to efficiently perform variable bit-rate coding, it is necessary to analyze the coding difficulty of an entire moving picture and to determine characteristics in advance as shown in FIG. 9A. It is possible to prepare a buffer with a relatively large capacity and to measure coding difficulty within an allowable range of the buffer. In this method, optimization is performed within the capacity range. It does not mean that optimization of the entire content is performed.

In order to solve the above problem, content coding difficulty information as shown in FIG. 9A is described in a content-information signal output from the multimedia content server 101. The transcoding unit 122 encodes a bit stream encoded at a fixed bit rate at a variable bit rate using the coding difficulty information and outputs the bit stream.

Specifically, in the transcoding unit 122 of the example shown in FIG. 7, the encoder 132 encodes the bit stream based on the content-information signal supplied from the multimedia content server 101 and outputs the bit stream.

Figure 10:
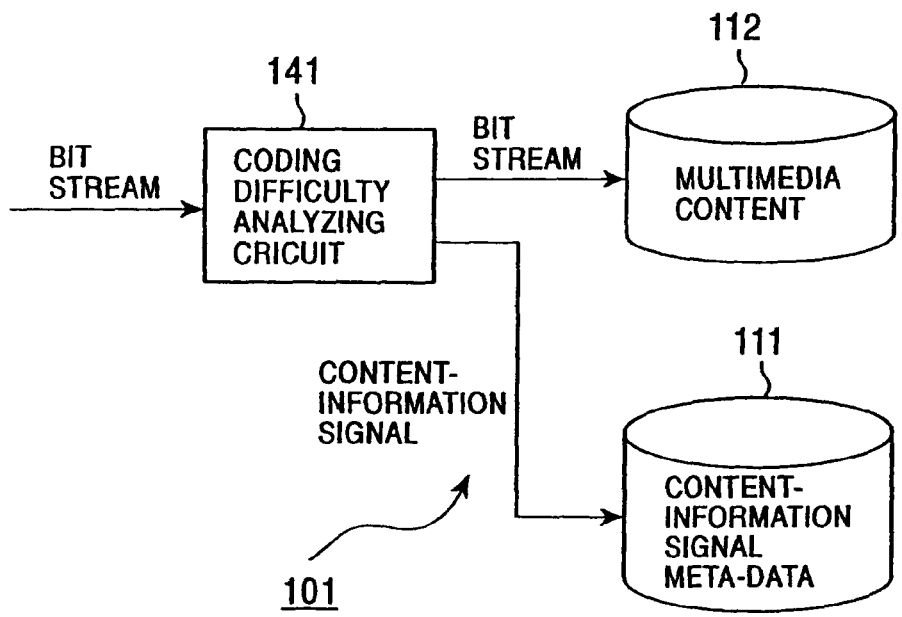
FIG. 10 illustrates recording in the multimedia content server shown in FIG. 4.

In contrast, referring to FIG. 10, when recording predetermined multimedia content in the multimedia content server 101 shown in FIG. 4, a bit stream is supplied from the outside to the multimedia content server 101. The bit stream is input to a coding difficulty analyzing circuit 141. Although a bit stream is input in this example, it is possible to directly input an uncompressed moving picture.

The coding difficulty analyzing circuit 141 analyzes the coding difficulty of the content and obtains a coding difficulty characteristic as shown in FIG. 9A. The coding difficulty analyzing circuit 141 outputs the characteristic as a content-information signal to the meta-data storage device 111 and outputs the input content bit stream to the content storage device 112.

Figure 11A:
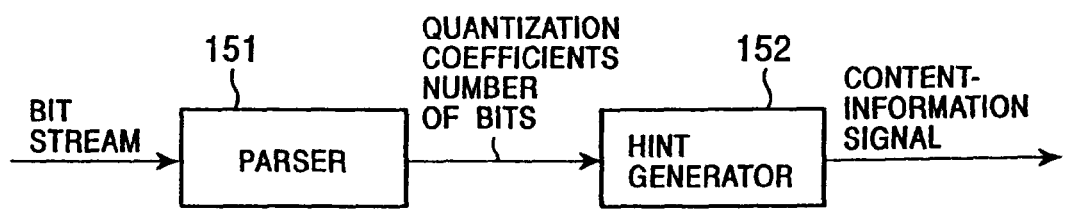
FIGS. 11A and 11B are block diagrams of the structure of a coding difficulty analyzing circuit shown in FIG. 10.
Figure 11B:
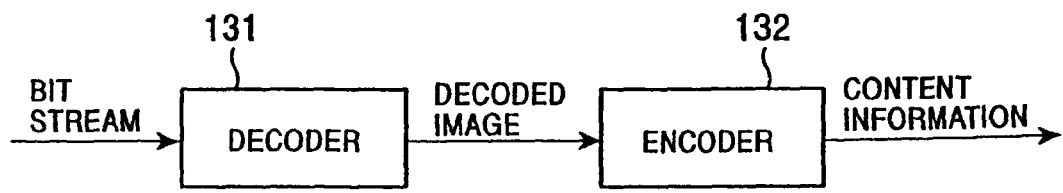

FIGS. 11A and 11B show examples of the structure of the coding difficulty analyzing circuit 141. Referring to FIG. 11A, an input bit stream is first input to a parsing circuit (parser) 151, and coding parameters (such as quantization coefficients and number of bits) are extracted from the bit stream. A hint generator 152 obtains an average Q of the quantization coefficients in each frame and the number of bits B generated in that frame. Furthermore, the hint generator 152 calculates Q×B to obtain coding difficulty of that frame and supplies the coding difficulty to the meta-data storage device 111 as a content-information signal. The meta-data storage device 111 records the content-information signal.

FIG. 11B shows a modification of the coding difficulty analyzing circuit 141. In this example, an input bit stream is decoded by a decoder 161. A decoded image is input to an encoder 162. The encoder 162 encodes the image on a fixed quantization scale, such as Q=1. The number of bits generated in each frame when encoding on Q=1 is coding difficulty of that frame, and the coding difficulty is supplied as content information to the meta-data storage device 111. The meta-data storage device 111 records the content information.

Referring to FIGS. 12A to 12D, an example of a format for describing a content-information signal is illustrated. In the example illustrated in FIGS. 12A to 12D, the content-information signal is described in TranscodingHint shown in FIG. 12A, which is a descriptor containing information which may give hints regarding transcoding. In the example shown in FIG. 12A, TranscodingHint includes an ID, a TranscodingParameterSet descriptor, and a TranscodingComplexityHint descriptor. The ID is an identification number for identifying a descriptor.

Referring to FIG. 12B, TranscodingParameterSet is a descriptor for describing optimal coding parameters when performing encoding and transcoding at each bit rate. TranscodingParameterSet consists of an ID, MinBitRate, MaxBitRate, FrameRate, and FrameSize.

MinBitRate is a flag indicating the minimum bit rate at which information in the descriptor is valid.

MaxBitRate is a flag indicating the maximum bit rate at which information in the descriptor is valid.

FrameRate is a flag indicating, when encoding a particular image at a bit rate ranging from MinBitRate to MaxBitRate, the frame rate at which optimal image quality is obtained.

FrameSize is a flag indicating the frame size in which optimal image quality is obtained when encoding a particular image at a bit rate ranging from MinBitRate to MaxBitRate.

TranscodingComplexityHint is a descriptor for describing the complexity of encoding and transcoding the content. FIG. 12C shows the structure of TranscodingComplexityHint. StartMediaLocator is a pointer indicating the head of a bit stream in which the information in the descriptor is valid.

EndMediaLocator is a pointer indicating the end of a bit stream in which the information in the descriptor is valid. Complexity is a flag indicating coding difficulty of a portion between StartMediaLocator and EndMediaLocator of the bit stream.

FIG. 12D shows another example of the structure of TranscodingComplexityHint. StartFrameNumber is a pointer indicating the frame number of the head frame in which the information in the descriptor is valid.

EndFrameNumber is a pointer indicating the frame number of the last frame in which the information in the descriptor is valid.

Complexity is a flag indicating coding difficulty of a portion between StartFrameNumber and EndFrameNumber of the bit stream.

Figure 13:
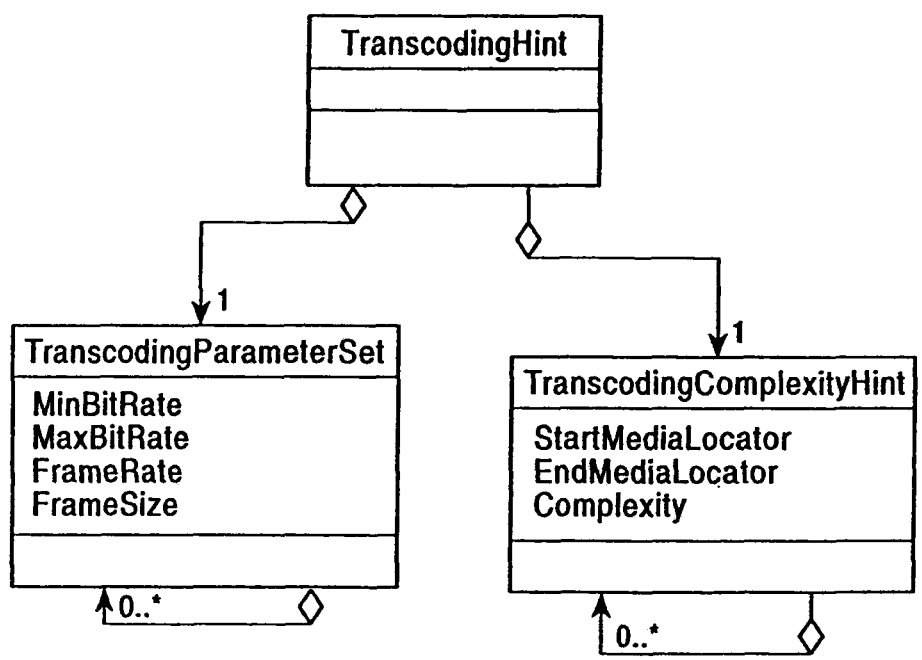
FIG. 13 illustrates the structure of a TranscodingHint descriptor.

FIG. 13 shows the data structure of the TranscodingHint descriptor shown in FIG. 12A, written in the Universal Modeling Language (UML). TranscodingHint includes at least one TranscodingParameterSet and at least one TranscodingComplexityHint. The number of repetitions of TranscodingParameterSet is zero or more. Also, the number of repetitions of TranscodingComplexityHint is zero or more.

MPEG-7 is a standard for meta-data which describes information on content. MPEG-7 includes a plurality of descriptors. The details of the specification of MPEG-7 are described in ISO/IEC SC29/WG11 N3112, N3113, and N3114. The TranscodingHint descriptor can be constructed as one type of meta-data in MPEG-7.

Figure 14:
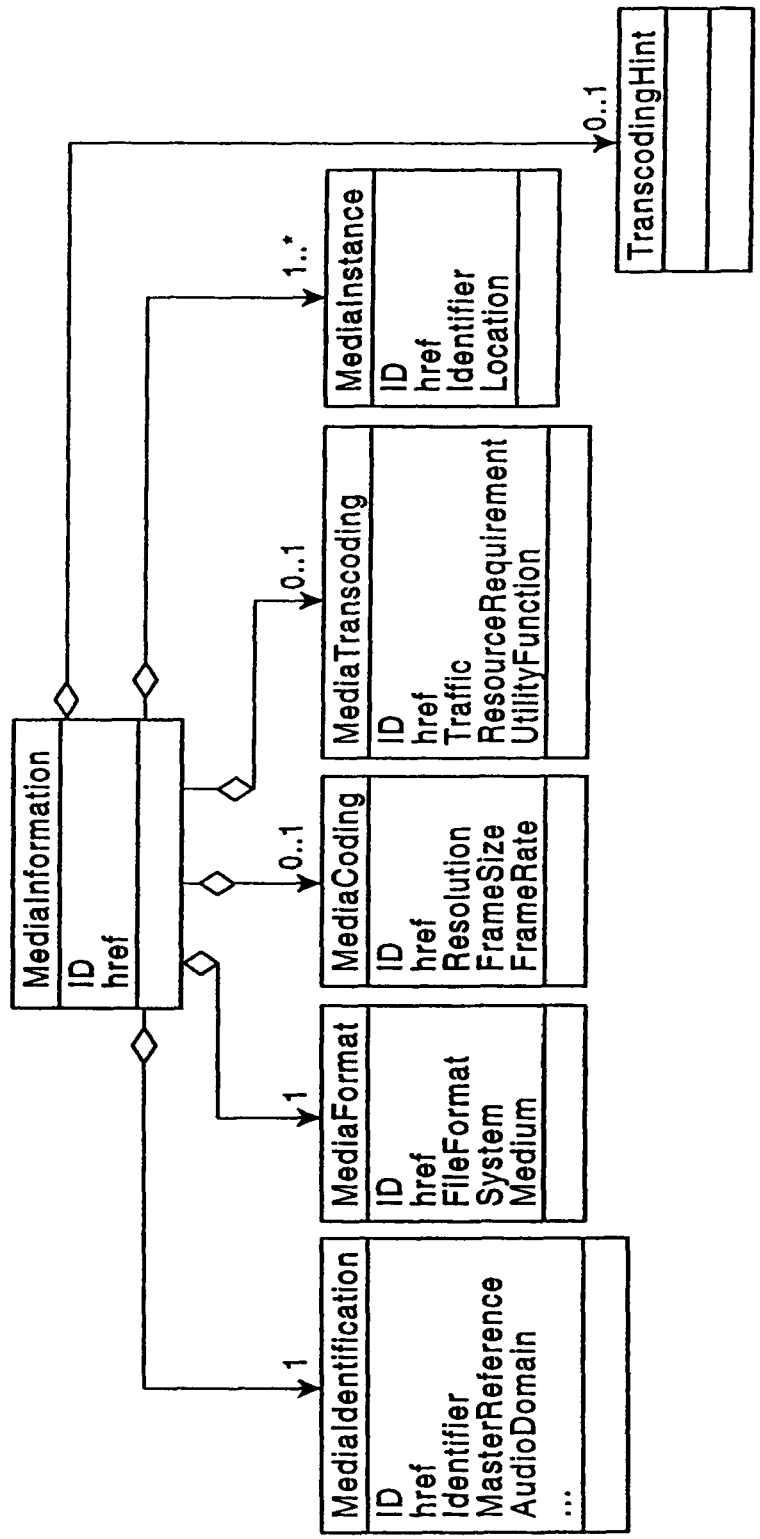
FIG. 14 illustrates the structure of MediaInformation.

FIG. 14 shows an example of the data structure of MediaInformation (including MediaIdentification, MediaFormat, MediaCoding, MediaTranscodingHint, and MediaInstance) in MPEG-7, to which the above TranscodingHint descriptor is added. MediaInformation is a descriptor for describing the media of the content, such as a coding system or the like. Zero or one TranscodingHint is described in MediaInformation.

MediaInformation is added to the entire content or to part of the content. In this example, TranscodingHint is also added either to the entire content or to part of the content.

Figure 15:
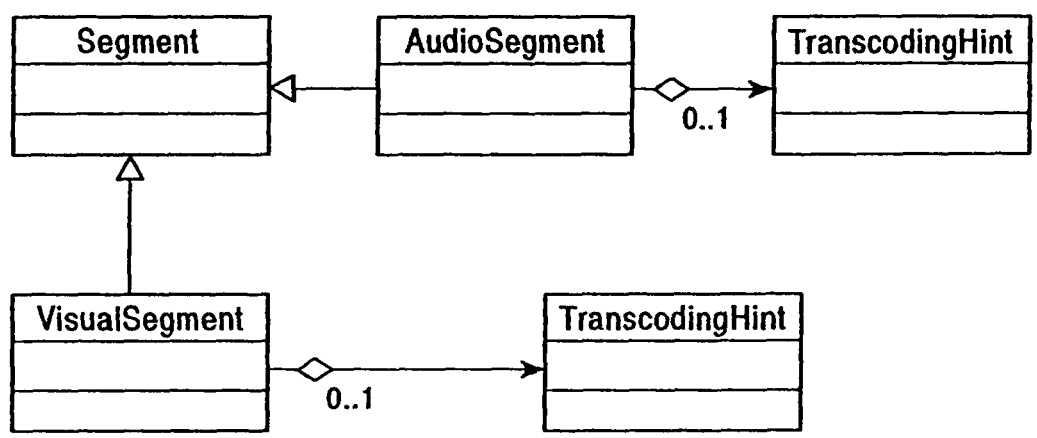
FIG. 15 illustrates the structure of Segment.

FIG. 15 shows an example of the data structure for description of TranscodingHint in Segment in MPEG-7. Segment is a descriptor for describing, when the content is divided into a plurality of divisions or scenes, information on each division. In this example, zero or one TranscodingHint descriptor is described in VisualSegment and in AudioSegment.

Segment is added to part of the content. In this example, TranscodingHint is also added to part of the content.

Figure 16:
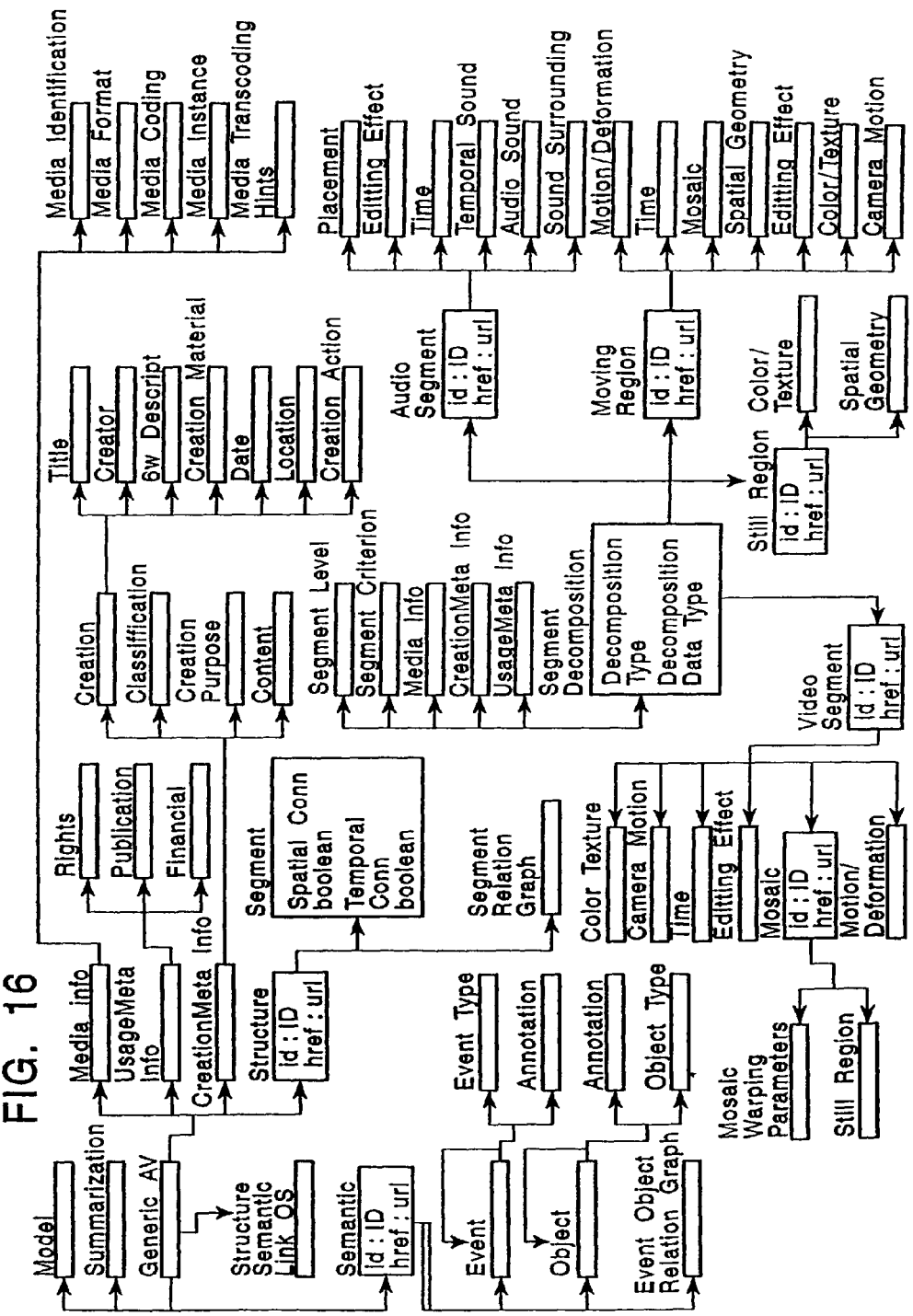
FIG. 16 illustrates the overall MPEG-7 data structure.

FIG. 16 shows the overall MPEG-7 data structure when TranscodingHint is added to MediaInformation in MPEG-7 as illustrated in FIG. 14.

Second Embodiment

Figure 17:
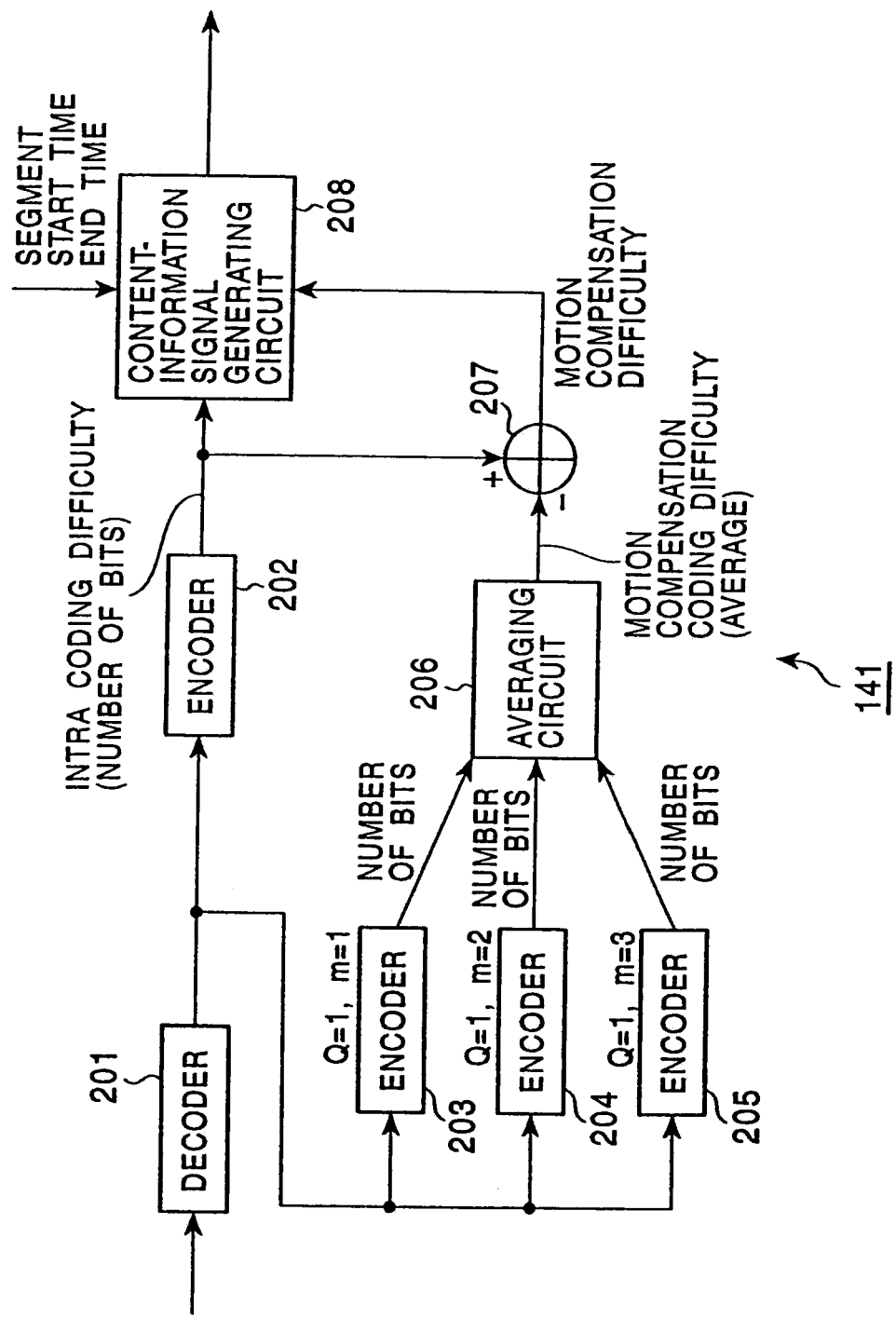
FIG. 17 is a block diagram of another example of the structure of the coding difficulty analyzing circuit shown in FIG. 10.

A system according to a second embodiment of the present invention is described below. According to the second embodiment, coding difficulty forming a content-information signal includes information indicating motion compensation difficulty and information indicating intra-coding difficulty. Based on the two pieces of information, it is possible to obtain a coding difficulty of a predetermined scene in the content of the first embodiment, as shown in FIG. 9A. FIG. 17 shows an example of the structure of the coding difficulty analyzing circuit 141 shown in FIG. 10 in this case.

If required, an input bit stream is decoded by a decoder 201, and the decoded bit stream is supplied to encoders 202 to 205. The encoder 202 performs intra-coding of the image data input from the decoder 201 using a quantification scale, such as Q=1. The number of bits generated in each frame when encoding at Q=1 is the intra-coding difficulty of encoding that frame, and this is in turn input to a content-information signal generating circuit 208.

The encoder 203 performs encoding (encoding of I and P pictures) using a fixed quantification scale, e.g., Q=1 and m=1. The encoder 204 performs encoding using a fixed quantification scale, e.g., Q=1 and m=2 (inserting a single-frame B picture between two adjacent P pictures). The encoder 205 performs encoding using a fixed quantification scale, e.g., Q=1 and m=3 (inserting B pictures in two frames between two adjacent P pictures).

An averaging circuit 206 calculates the average of the outputs of the encoders 203 to 205. The average is supplied as a motion compensation coding difficulty to a difference circuit 207.

The difference circuit 207 subtracts the output of the averaging circuit 206 from the output of the encoder 202 and supplies the difference value to the content-information signal generating circuit 208. The start time and the end time of a segment are supplied from an external unit (not shown) to the content-information signal generating circuit 208. The content-information signal generating circuit 208 generates a content-information signal based on the output of the encoder 202 and on the output of the difference circuit 207 for a segment specified by the start time and the end time. The content-information signal is supplied to the meta-data storage device 111.

In operation, if required, the decoder 201 decodes the input bit stream and supplies the decoded bit stream to the encoders 202 to 205. The encoder 202 only performs intra-coding using Q=1. The number of bits generated in each frame indicates the intra-coding difficulty of encoding that frame. The intra-coding difficulty is supplied to the content-information signal generating circuit 208 and the difference circuit 207.

The intra-coding difficulty is described in TextureHint (FIG. 19C) which will be described hereinafter.

The encoder 203 encodes the image data supplied from the decoder 201 using Q=1 and m=1. The encoder 204 encodes the image data output from the decoder 201 using Q=1 and the m=2. The encoder 205 encodes the image data from the decoder 201 using Q=1 and m=3. The encoders 203 to 205 output the number of bits generated in each frame to the averaging circuit 206.

The averaging circuit 206 calculates the average of the number of bits generated in each of the frames, which are supplied from the encoders 203 and 205. The average is supplied as a motion compensation coding difficulty to the difference circuit 207.

The difference circuit 207 subtracts the motion compensation difficulty, which is supplied from the averaging circuit 206, from the intra-coding difficulty indicating the intra-coding difficulty, which is supplied from the encoder 202. The remainder is supplied as motion compensation difficulty to the content-information signal generating circuit 208.

The motion compensation difficulty is described in MotionHint (FIG. 19B) which will be described hereinafter.

The content-information signal generating circuit 208 generates a content-information signal based on the intra-coding difficulty supplied from the encoder 202 and the motion compensation difficulty supplied from the difference circuit 207 and supplies the content-information signal to the meta-data storage device 111. The meta-data storage device 111 records the supplied content-information signal.

Figure 18:
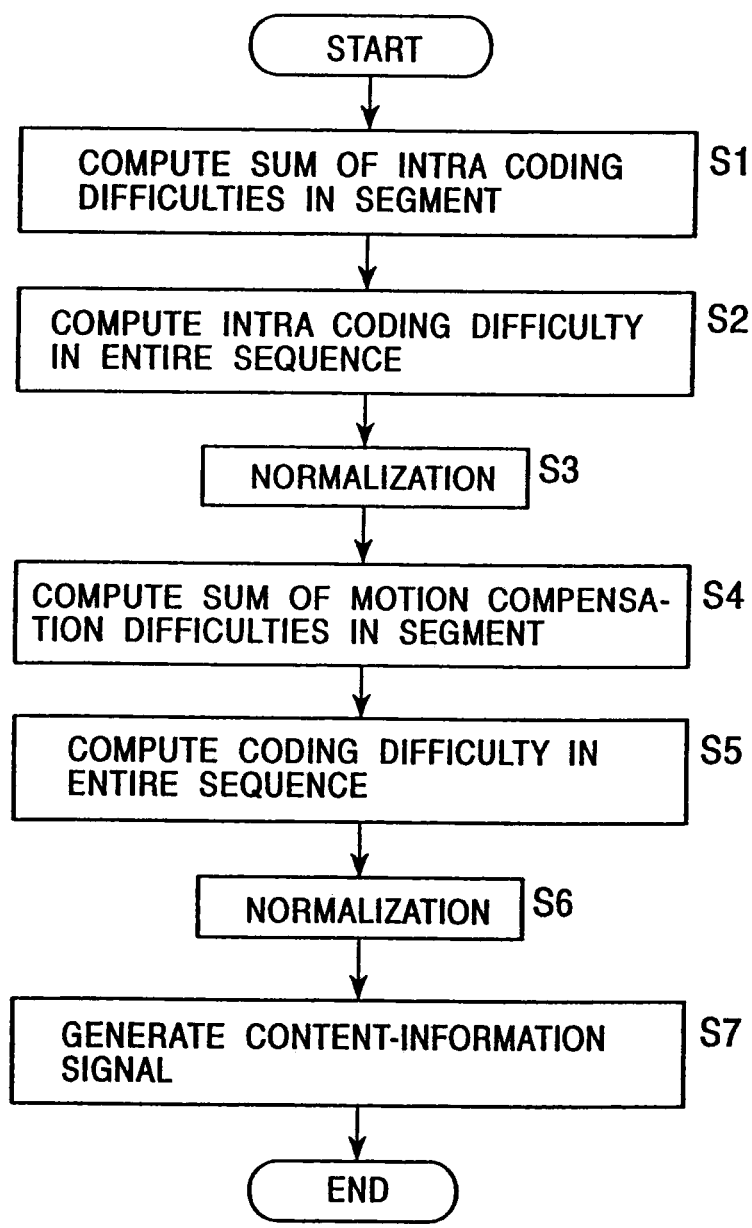
FIG. 18 is a flowchart showing a process performed by a content-information signal generating circuit shown in FIG. 17.

FIG. 18 is a flowchart showing a content-information signal generating process performed by the content-information signal generating circuit 208.

In step S1, the content-information signal generating circuit 208 sums up the intra-coding difficulties in all frames in a segment specified by the start time and the end time.

A segment represents a predetermined interval of a video signal in the time domain. A video content consists of a single or a plurality of segments. A specific example of a segment will be described hereinafter with reference to FIG. 22.

In step S2, the content-information signal generating circuit 208 sums up the intra-coding difficulties of all the frames in the overall sequence.

In step S3, the content-information signal generating circuit 208 performs normalization using the following equation, computing Difficulty in TextureHint as described below:

Difficulty=(sum of intra-coding difficulties in segment+number of frames in segment)+(sum of intra-coding difficulties in overall sequence+number of frames in overall sequence)

The difficulty is obtained for each segment.

In step S4, the content-information signal generating circuit 208 sums up the intra-coding difficulties in the segment. In step S5, the coding difficulty of the overall sequence is computed. In step S6, the content-information signal generating circuit 208 performs normalization for each segment using the following equation, computing Motion_uncompensability of MotionHint as described below:

Motion_uncompensability=(sum of motion compensation difficulties in segment+number of frames in segment)+(sum of motion compensation difficulties in overall sequence+number of frames in overall sequence)

The motion_uncompensability is obtained for each segment.

In step S7, the content-information signal generating circuit 208 generates MediaTranscodingHint as a content-information signal based on the computational results in steps S3 and S6.

MediaTranscodingHint is a descriptor for describing optimal coding parameters for performing transcoding. FIG. 19A shows the MediaTranscodingHint descriptor in the second embodiment of the present invention.

Referring to FIG. 19A, MediaTranscoding includes an ID, UtilityScaling( ), MotionHint( ), and TextureHint( ).

UtilityScaling is a descriptor for describing image quality of content at each bit rate.

Referring to FIG. 19B, MotionHint is a descriptor for describing the motion compensation difficulty of the content. MotionHint includes an ID, Motion_uncompensability, Motion_range_x_left, Motion_range_x_right, Motion_range_y_left, and Motion_range_y_right.

When the inter-frame correlation is low, the coding efficiency that can be improved by motion compensation is not very high. It is therefore necessary to allocate more bits to portions in which inter-frame correlation is low. Motion_uncompensability is a parameter which takes a value from 0 to 1. The value 0 indicates that the frames are identical, and the value 1 indicates that no correlation is detected between the frames. The motion compensation difficulty output from the difference circuit 207 is described in Motion_uncompensability.

Motion_range_x_left and Motion_range_x_right indicate the maximum amount of change in motion in a horizontal direction caused by motion compensation. Similarly, Motion_range_y_left and Motion_range_y_right indicate the maximum amount of change in motion in a vertical direction caused by motion compensation. These indicate the maximum search range in the horizontal and vertical directions for motion vector detection. By specifying a maximum value of a motion vector in advance, the amount of computation required in transcoding is reduced while image quality is maintained.

TextureHint is a descriptor for describing compression difficulty of the content in the space domain. The intra-coding difficulty output from the encoder 202 shown in FIG. 17 is described in TextureHint. Referring to FIG. 19C, TextureHint includes an ID, Difficulty, and DifficultyType.

Difficulty is a flag indicating the intra-coding difficulty of the content, that is, it indicates the difficulty of coding without performing motion compensation.

Figures 20, 21:
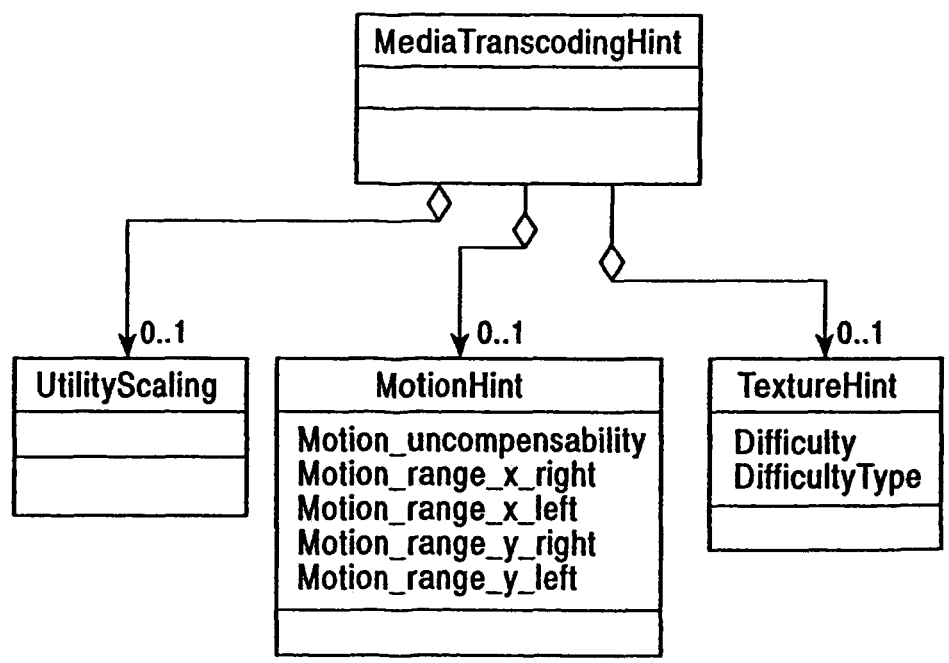
FIG. 20 is a table describing a DifficultyType.
FIG. 21 illustrates the structure of a MediaTranscodingHint descriptor.

DifficultyType is a flag indicating processing of Difficulty, that is, it indicates how Difficulty described in the descriptor is measured. Referring to FIG. 20, the value "0" in DifficultyType indicates Encoding Difficulty.

FIG. 21 shows the data structure of MediaTranscodingHint shown in FIG. 19A using UML.

The MediaTranscoding descriptor includes zero or one UtilityScaling descriptor, zero or one MotionHint descriptor, and zero or one TextureHint descriptor.

Figure 22:
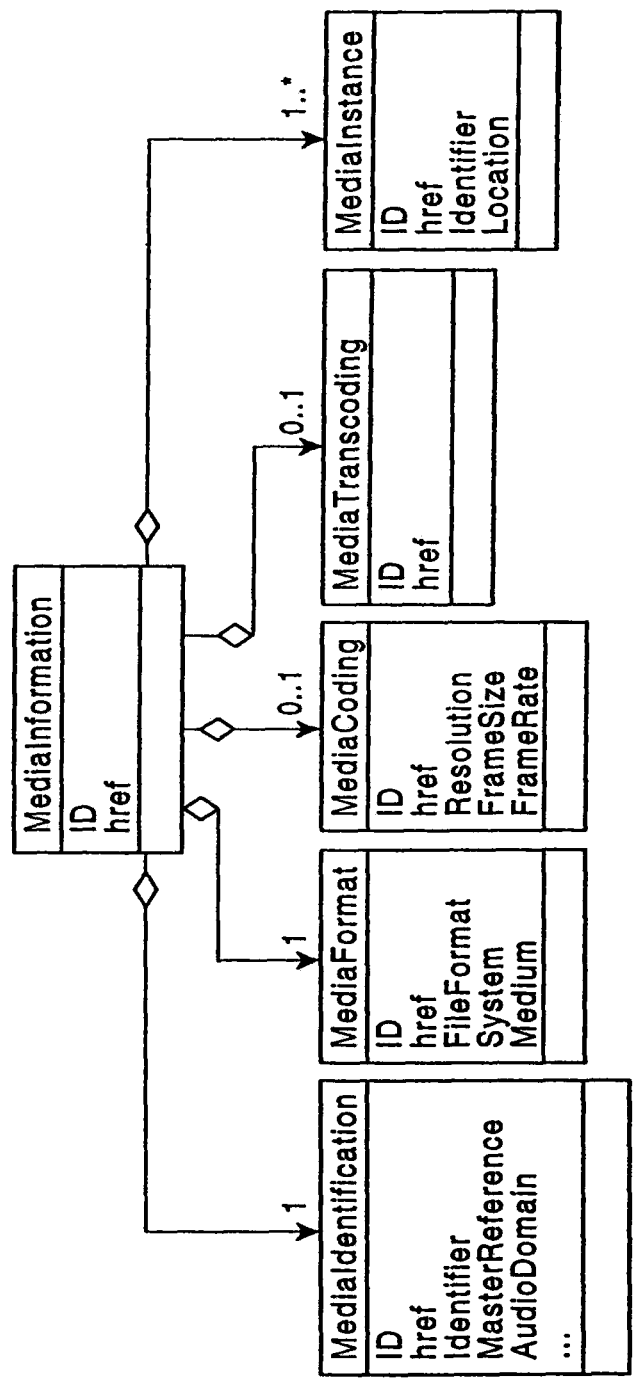
FIG. 22 illustrates the structure of MediaInformation.

Referring to FIG. 22, MediaTranscoding shown in FIG. 21 includes MediaIdentification, MediaFormat, MediaInstance, and MediaInformation which describes the media of the content, such as a coding system or the like.

MediaInformation is added to the entire content or to part of the content. Thus, MediaTranscodingHint is also added to the entire content or to part of the content.

Figure 23:
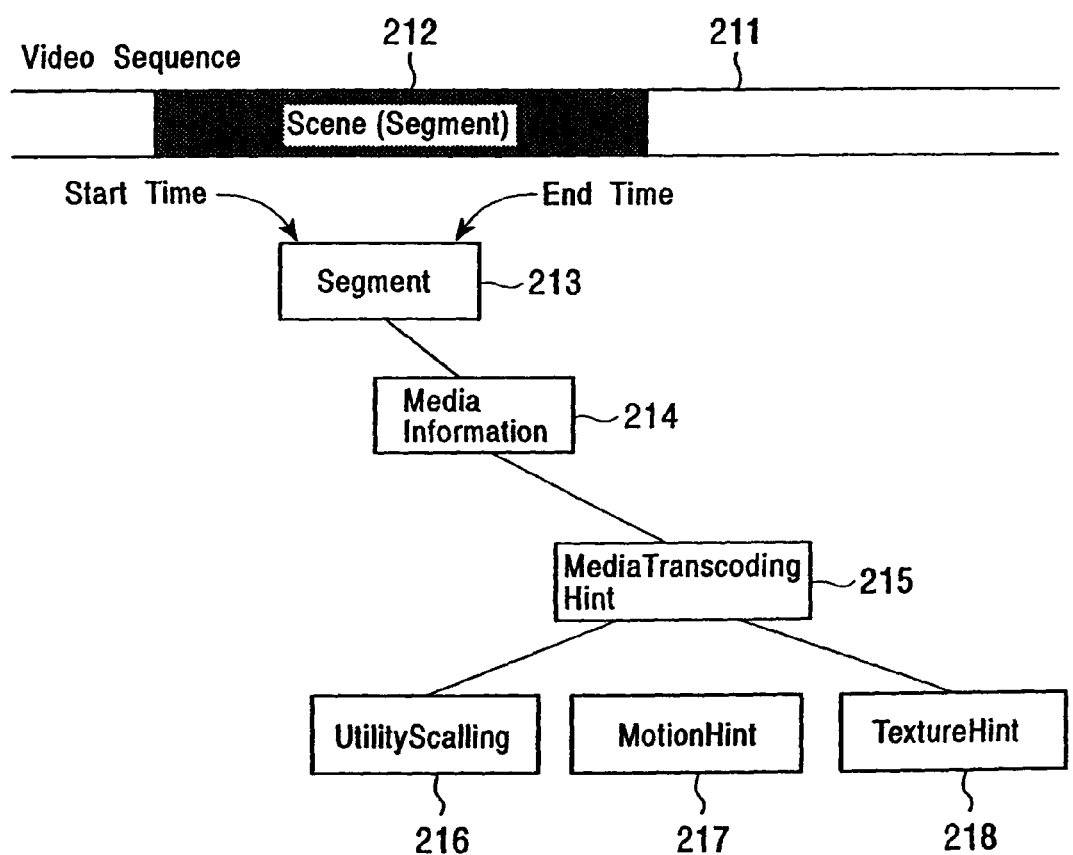
FIG. 23 illustrates the relationship between video data and Segment.

FIG. 23 schematically shows the relationship of MediaTranscodingHint to video data. Video content 211 includes at least one sequence. A scene (segment) 212, which is part of the sequence, is defined by the start time and the end time. Information (the start time, the end time, and the like) concerning the segment 212 is described in a Segment descriptor 213. A single MediaInformation descriptor 214 can be defined for single content or for a single Segment descriptor. When defining the MediaInformation descriptor 214 as a child descriptor of the Segment descriptor 213, a MediaTranscodingHint descriptor 215 is defined for each segment (scene) since the MediaTranscodingHint descriptor 215 is a child descriptor of the MediaInformation descruotir 214. The MediaTranscodingHint descriptor 215 includes child descriptors, i.e., a UtilityScaling descriptor 216, a MediaHint descriptor 217, and a TextureHint descriptor 218.

The MediaInformation descriptor 214 and the child descriptors thereof become child descriptors of the Segment descriptor 213. The contents of the description are only valid within the period from the start time to the end time, which are defined by the parent descriptor Segment descriptor 213.

The above processing can be performed by hardware or by software. When performing the series of processing by software, a program is installed from a network or a recording medium in a computer incorporated in dedicated hardware or in a general-purpose personal computer capable of executing various functions by installing various programs.

FIG. 24 shows an example of the structure of a personal computer for performing the foregoing processing. A central processing unit (CPU) 221 executes various processes in accordance with a program stored in a read only memory (ROM) 222 or a program loaded from a storage device 228 to a random access memory (RAM) 223. As occasion demands, the RAM 223 stores data required for the CPU 221 to perform various processes.

The CPU 221, the ROM 222, and the RAM 223 are interconnected via a bus 224. An input/output interface 225 is connected to the bus 224.

An input unit 226 including a keyboard and a mouse; an output unit 227 including a display, e.g., a cathode-ray tube (CRT) or a liquid crystal display (LCD), and a speaker; the storage device 228 including a hard disk; and a communication unit 229 including a modem and a terminal adapter are connected to the input/output interface 225. The communication unit 229 performs communication processing via a network.

If required, a drive 230 can be connected to the input/output interface 225. A magnetic disk 241, an optical disk 242, a magneto-optical disk 243, and/or a semiconductor memory 244 can be appropriately inserted. Computer programs can be read from these recording media and can be installed in the storage device 228 as circumstances demand.

The recording media having programs recorded thereon are distributed separately from the computer, in order to supply the programs to users. The recording media include packaged media such as the magnetic disk 241 (including a floppy disk), the optical disk 242 (including a compact disk-read only memory (CD-ROM) and a digital versatile disk (DVD)), the magneto-optical disk 243 (including a mini-disk (MD)), and the semiconductor memory 244. In addition, the recording media include the ROM 222 having the program recorded thereon or the hard disk included in the storage device 228, which are incorporated beforehand in a computer and then distributed to the users.

In the present description, steps for writing a program recorded in a recording medium not only include time-series processing performed in accordance with the described order but also include parallel or individual processing, which may not necessarily be performed in time series.

In the present description, the system represents an overall apparatus formed by a plurality of apparatuses. Furthermore, although the content is chiefly described using an image signal by way of example, the content is not restricted to the image signal. The content includes an audio signal, a program, a text signal, or the like.

What is claimed is:

1. A converting apparatus for converting content in a first format into content in a second format, comprising:
    a memory for storing (i) the content in the first format and (ii) a content-information concerning the content in the first format, wherein the content-information includes image quality information of the content related to one or more bit rates of the content, including the minimum and maximum bits rates at which the content-information is valid;
    an obtaining unit for obtaining information on a terminal including resolution of the terminal; and
    a converting unit for converting the content in the first format in the memory to the content in the second format suitable for the terminal based on the image quality information of the content and the information on the terminal.

2. A converting apparatus according to the claim 1, wherein the image quality information of the content includes an image size related to a bit rate of the content.

3. A converting apparatus according to the claim 1, wherein the image quality information of the content includes an optimal image size for encoding the content related to a bit rate of the content.

4. A converting apparatus according to the claim 1, wherein the image quality information of the content is a function of an optimal image size for encoding the content related to a bit rate of the content.

5. A computer-implemented converting method for converting content in a first format into content in a second format, comprising:
    storing, in a memory, (i) the content in the first format and (ii) a content-information concerning the content in the first format, wherein the content-information includes image quality information of the content related to one or more bit rates of the content, including the minimum and maximum bits rates at which the content-information is valid;
    obtaining information on a terminal including resolution of the terminal; and
    using a processor to convert the content in the first format in the memory to the content in the second format suitable for the terminal based on the image quality information of the content and the information on the terminal.

6. A method according to the claim 5, wherein the image quality information of the content includes an image size related to a bit rate of the content.

7. A method according to the claim 5, wherein the image quality information of the content includes an optimal image size for encoding the content related to a bit rate of the content.

8. A method according to the claim 5, wherein the image quality information of the content is a function of an optimal image size for encoding the content related to a bit rate of the content.

9. A computer-readable medium storing a set of instructions for executing a method for converting content in a first format into content in a second format, the method comprising:
    storing, in a memory, (i) the content in the first format and (ii) a content-information concerning the content in the first format, wherein the content-information includes image quality information of the content related to one or more bit rates of the content, including the minimum and maximum bits rates at which the content-information is valid;
    obtaining information on a terminal including resolution of the terminal; and
    converting the content in the first format in the memory to the content in the second format suitable for the terminal based on the image quality information of the content and the information on the terminal.

10. A computer-readable medium according to the claim 9, wherein the image quality information of the content includes an image size related to a bit rate of the content.

11. A computer-readable medium according to the claim 9, wherein the image quality information of the content includes an optimal image size for encoding the content related to a bit rate of the content.

12. A computer-readable medium according to the claim 9, wherein the image quality information of the content is a function of an optimal image size for encoding the content related to a bit rate of the content.

* * * * *